(12) United States Patent
Dudda et al.

(10) Patent No.: US 12,317,291 B2
(45) Date of Patent: May 27, 2025

(54) CONDITIONAL UPLINK RADIO RESOURCE UTILIZATION IN A CELLULAR NETWORK

(71) Applicant: Telefonaktiebolaget LM Ericsson (publ), Stockholm (SE)

(72) Inventors: Torsten Dudda, Wassenberg (DE); Stefan Parkvall, Bromma (SE); Per Synnergren, Gammelstad (SE); Stefan Wager, Espoo (FI); Hanzhi Zhang, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/741,879

(22) Filed: Jun. 13, 2024

(65) Prior Publication Data

US 2024/0334445 A1    Oct. 3, 2024

Related U.S. Application Data

(63) Continuation of application No. 18/108,856, filed on Feb. 13, 2023, now Pat. No. 12,041,634, which is a
(Continued)

(51) Int. Cl.
*H04W 72/23* (2023.01)
*H04W 28/02* (2009.01)
(Continued)

(52) U.S. Cl.
CPC ....... *H04W 72/23* (2023.01); *H04W 28/0278* (2013.01); *H04W 72/04* (2013.01);
(Continued)

(58) Field of Classification Search
CPC . H04W 72/23; H04W 76/38; H04W 28/0278; H04W 72/04
See application file for complete search history.

(56) References Cited

U.S. PATENT DOCUMENTS 10,986,662 B2    4/2021   Dudda et al.
11,743,908 B2 *  8/2023   Dudda ............... H04W 76/38
(Continued)

FOREIGN PATENT DOCUMENTS

CN   102083224 A   6/2011
CN   102369778 A   3/2012
(Continued)

OTHER PUBLICATIONS

"Persistent scheduling for UL", 3GPP TSG-RAN WG2 Meeting #60bis, R2-080019, R2-074679, Nokia Corporation, Nokia Siemens Networks, Sevilla, Spain, Jan. 14-18, 2008, 4 pages.
(Continued)

*Primary Examiner* — Myron Wyche
(74) *Attorney, Agent, or Firm* — Murphy, Bilak & Homiller, PLLC

(57) ABSTRACT

A communication device receives an uplink grant from a node of a cellular network. The uplink grant indicates uplink radio resources allocated to the communication device in reoccurring time intervals. For each of these time intervals, the communication device selects between an active mode and an inactive mode. In the active mode the communication device performs an uplink transmission in the allocated uplink radio resources. In the inactive mode the communication device performs no uplink transmission in the allocated uplink radio resources.

20 Claims, 19 Drawing Sheets

Related U.S. Application Data continuation of application No. 17/209,651, filed on Mar. 23, 2021, now Pat. No. 11,743,908, which is a continuation of application No. 16/793,639, filed on Feb. 18, 2020, now Pat. No. 10,986,662, which is a continuation of application No. 16/114,606, filed on Aug. 28, 2018, now Pat. No. 10,609,729, which is a continuation of application No. 14/897,052, filed as application No. PCT/EP2014/068509 on Sep. 1, 2014, now Pat. No. 10,129,905.

(51) Int. Cl.
*H04W 72/04* (2023.01)
*H04W 72/0446* (2023.01)
*H04W 72/1268* (2023.01)
*H04W 76/38* (2018.01)

(52) U.S. Cl.
CPC ... *H04W 72/0446* (2013.01); *H04W 72/1268* (2013.01); *H04W 76/38* (2018.02)

(56) References Cited

U.S. PATENT DOCUMENTS

| | | |
|---|---|---|
| 2009/0239566 A1 | 9/2009 | Pelletier et al. |
| 2010/0240384 A1 | 9/2010 | Nobukiyo et al. |
| 2011/0246865 A1 | 10/2011 | Wen et al. |
| 2011/0310833 A1 | 12/2011 | Lee et al. |
| 2012/0033554 A1 | 2/2012 | Shiva et al. |
| 2012/0190376 A1 | 7/2012 | Rosa et al. |
| 2012/0287877 A1 | 11/2012 | Han et al. |
| 2012/0320805 A1 | 12/2012 | Yang et al. |
| 2014/0211725 A1 | 7/2014 | Damnjanovic et al. |
| 2014/0307663 A1 | 10/2014 | Huang et al. |
| 2015/0023285 A1 | 1/2015 | Gauvreau et al. |
| 2015/0103749 A1 | 4/2015 | Kela et al. |
| 2016/0205703 A1 | 7/2016 | Dudda et al. |

FOREIGN PATENT DOCUMENTS

| | | |
|---|---|---|
| CN | 103069907 A | 4/2013 |
| CN | 103828465 A | 5/2014 |
| EP | 2217013 A1 | 8/2010 |
| EP | 2237633 A1 | 10/2010 |
| JP | 2010068522 A | 3/2010 |
| JP | 2010081597 A | 4/2010 |
| JP | 2012520616 A | 9/2012 |
| JP | 2012523146 A | 9/2012 |
| JP | 2013506386 A | 2/2013 |
| JP | 2013093892 A | 5/2013 |
| JP | 2014514831 A | 6/2014 |
| WO | 2009057391 A1 | 5/2009 |
| WO | 2012022369 A1 | 2/2012 |
| WO | 2013169173 A1 | 11/2013 |

OTHER PUBLICATIONS

"Physical Channels for Scheduling Request and Timing Synchronization in E-UTRA Uplink", 3GPP TSG RAN WG1 LTE Ad Hoc, R1-061661, Cannes, France, Jun. 27-30, 2006, 5 pages.
"Reply to LS on CSG Cells Handling", 3GPP TSG RAN WG2 Meeting #60, R2-075166, CT1, Jeju, Korea ((C1-072709, to RAN2). Reply LS (to R2-073740) on CSG Cells Handling), Nov. 5-9, 2007, 2 pages.
3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.2.1, Jun. 2014, 1-57.
Ericsson, "Study on Latency Reduction Techniques for LTE—Motiviation for New proposed SI", Jun. 2, 2014, 1-6.
"SI: Study on Latency reduction techniques for LTE", 3GPP TSG RAN Meeting #64 RP-140622 Sophia Antipolis, France, Jun. 10-13, 2014, 1-6.

\* cited by examiner

CONDITIONAL UPLINK RADIO RESOURCE UTILIZATION IN A CELLULAR NETWORK

RELATED APPLICATIONS

This application is a continuation of Ser. No. 18/108,856 filed 13 Feb. 2023, which is a continuation of U.S. application Ser. No. 17/209,651 filed 23 Mar. 2021 and issued as U.S. Pat. No. 11,743,908, which is a continuation of U.S. application Ser. No. 16/793,639 filed 18 Feb. 2020 and issued as U.S. Pat. No. 10,986,662, which is a continuation of U.S. application Ser. No. 16/114,606 filed 28 Aug. 2018 and issued as U.S. Pat. No. 10,609,729, which is a continuation of U.S. application Ser. No. 14/897,052 filed 9 Dec. 2015 and issued as U.S. Pat. No. 10,129,905 and which is a U.S. National Phase Application of PCT/EP2014/068509 filed 1 Sep. 2014. The entire contents of each aforementioned application is incorporated herein by reference.

TECHNICAL FIELD

The present invention relates to methods for controlling radio transmission in a cellular network and to corresponding devices.

BACKGROUND

In cellular networks, allocation of radio resources to a certain user equipment (UE), also referred to as scheduling, is typically accomplished dynamically on the network side. In the downlink (DL) direction from the cellular network to the UE, a network node may allocate radio resources in accordance with a need to transmit DL data to the UE. The network node may then inform the UE about the allocated resources by sending a DL assignment. For the uplink (UL) direction from the UE to the cellular network, a scheduling request which is sent by the UE to the cellular network may be used to indicate that the UE needs radio resources for sending UL data. For example, in the LTE (Long Term Evolution) radio access technology specified by 3GPP (3rd Generation Partnership Project), a base station of the LTE radio access technology, referred to as "evolved Node B" (eNB) is responsible for the scheduling. This may be accomplished dynamically, taking into account the instantaneous traffic pattern and radio propagation characteristics of each UE.

In the dynamic scheduling process of the LTE radio access technology a UE which needs to send UL data may first send a scheduling request to an eNB which serves the cell of the UE. The scheduling request may be sent on a UL control channel, referred to as PUCCH (Physical UL Control Channel), providing dedicated resources for sending scheduling requests by the UE. Alternatively, the scheduling request may be sent on a contention based random access channel (RACH). The eNB then allocates UL radio resources to the UE. The allocated UL radio resources are indicated in a UL grant, which is sent from the eNB to the UE. A separate UL grant is sent for each subframe or TTI (Transmission Time Interval) of 1 ms. On the allocated UL radio resources, the UE may then send UL data to the eNB. In addition, the UE may also send a buffer status report (BSR) indicating the amount of buffered UL data still to be sent by the UE.

In the above process of transmitting the UL data, latency occurs which is due to the sending of the scheduling request before the UE can proceed with the transmission of the UL data. However, such delay is not desirable in many cases. For example, certain data traffic may be sensitive to latency, such as data traffic associated with online gaming.

A technology which may be used for achieving a reduced latency is Semi-Persistent Scheduling (SPS) as specified in 3GPP TS 36.321 V12.2.1 (2014-06). In SPS, UL radio resources are periodically allocated to the UE by sending a long lasting grant that which covers multiple TTIs by allocating UL radio resources in a pattern of TTIs with configurable periodicity. By utilizing SPS, the need to send of scheduling requests may be reduced.

However, to achieve a certain latency by utilizing SPS, it may be necessary to configure the allocated SPS UL radio resources with a short periodicity. This may result in allocating more UL radio resources to the UE than actually required. Nonetheless, the UE needs to perform a UL transmission on all allocated UL radio resources, which means that UL transmissions are filled by padding. This sending of padding UL transmissions may cause undesired energy consumption on the UE side and may also increase interference.

Accordingly, there is a need for techniques which allow for efficiently controlling radio transmissions in a cellular network, in particular with respect to UL transmissions with low latency.

SUMMARY

According to an embodiment of the invention, a method of controlling radio transmission in a cellular network is provided. According to the method, a communication device receives a UL grant from the cellular network. The UL grant indicates UL radio resources allocated to the communication device in reoccurring time intervals. For each of these time intervals, the communication device selects between an active mode and an inactive mode. In the active mode the communication device performs a UL transmission in the allocated UL radio resources. In the inactive mode the communication device performs no UL transmission in the allocated UL radio resources.

According to a further embodiment of the invention, a method of controlling radio transmission in a cellular network is provided. According to the method, a node of the cellular network sends a UL grant to a communication device. The UL grant indicates UL radio resources allocated to the communication device in reoccurring time intervals. For each of these time intervals, the node selects between an active mode and an inactive mode. In the active mode the communication device performed a UL transmission in the allocated UL radio resources. In the inactive mode the communication device performed no UL transmission in the allocated UL radio resources.

According to a further embodiment of the invention, a communication device is provided. The communication device comprises an interface for connecting to a cellular network. Further, the communication device comprises at least one processor. The at least one processor is configured to receive a UL grant from the cellular network. The UL grant indicates UL radio resources allocated to the communication device in reoccurring time intervals. Further, the at least one processor is configured to, for each of these time intervals, select between an active mode and an inactive mode. In the active mode the communication device performs a UL transmission in the allocated UL radio resources. In the inactive mode the communication device performs no UL transmission in the allocated UL radio resources.

According to a further embodiment of the invention, a node for a cellular network is provided. The node comprises an interface for connecting to a communication device. Further, the node comprises at least one processor. The at least one processor is configured to send a UL grant to the communication device. The UL grant indicates UL radio resources allocated to the communication device in reoccurring time intervals. Further, the at least one processor is configured to, for each of these time intervals, select between an active mode and an inactive mode. In the active mode the communication device performed a UL transmission in the allocated UL radio resources. In the inactive mode the communication device performed no UL transmission in the allocated UL radio resources.

According to a further embodiment of the invention, a computer program or computer program product is provided, e.g., in the form of a non-transitory storage medium, which comprises program code to be executed by at least one processor of a communication device. Execution of the program code causes the at least one processor to receive a UL grant from a cellular network. The UL grant indicates UL radio resources allocated to the communication device in reoccurring time intervals. Further, execution of the program code causes the at least one processor to, for each of these time intervals, select between an active mode and an inactive mode. In the active mode the communication device performs a UL transmission in the allocated UL radio resources. In the inactive mode the communication device performs no UL transmission in the allocated UL radio resources.

According to a further embodiment of the invention, a computer program or computer program product is provided, e.g., in the form of a non-transitory storage medium, which comprises program code to be executed by at least one processor of a node of a cellular network. Execution of the program code causes the at least one processor to send a UL grant to a communication device. The UL grant indicates UL radio resources allocated to the communication device in reoccurring time intervals. Further, execution of the program code causes the at least one processor to, for each of these time intervals, select between an active mode and an inactive mode. In the active mode the communication device performed a UL transmission in the allocated UL radio resources. In the inactive mode the communication device performed no UL transmission in the allocated UL radio resources.

Details of such embodiments and further embodiments will be apparent from the following detailed description of embodiments.

DETAILED DESCRIPTION

Figure 1:
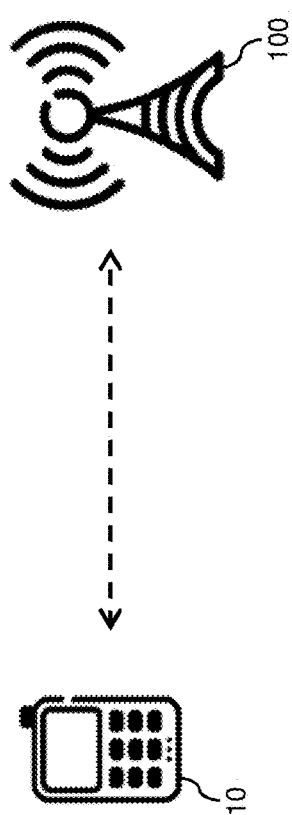
FIG. 1 schematically illustrates an exemplary cellular network environment with elements which may be involved in controlling UL transmissions according to an embodiment of the invention.

In the following, concepts in accordance with exemplary embodiments of the invention will be explained in more detail and with reference to the accompanying drawings. The illustrated embodiments relate to concepts for controlling radio transmission in a cellular network. The embodiments specifically refer to a scenario using LTE radio access technology. However, it should be understood that the concepts could also be applied in connection with other radio access technologies, e.g., Universal Mobile Telecommunications System (UMTS) radio access technology.

According to the illustrated concepts, UL transmissions from a communication device to the cellular network are performed on UL radio resources which may be allocated by two types of UL grants: first UL grants, in the following referred to as IUA-UL grant (IUA: Instant UL Access), which each indicate radio resources allocated to the communication device in reoccurring time intervals, and second UL grants, in the following referred to as dynamic UL grant (D-UL grant), which each indicate UL radio resources allocated to the communication device on a one time basis. The radio transmissions may be organized in radio frames each formed of a sequence of subframes, and the above-mentioned time periods may correspond to the individual subframes. For example, in the LTE radio access technology the time intervals may correspond to subframes of 1 ms duration. The IUA-UL grant may be provided to the communication device in preparation of a future UL transmission by the communication device, without any indication of a specific need to transmit UL data by the communication device. As compared to that, the D-UL grants are provided to the communication device in a dynamic manner, in particular on an as-needed basis. For example, a D-UL grant may be sent in response to a scheduling request by the communication device or in response to a BSR from the communication device. The IUA-UL grant and the D-UL grants may be sent on a DL control channel, such as a PDCCH (Physical DL control channel) of the LTE radio access technology. By means of the IUA-UL grants, a low latency associated with a UL transmission by the communication device may be provided. Specifically, on the UL radio resources indicated by the IUA-UL grant, the communication device may perform the UL transmission without previously indicating to the cellular network that there is a need to transmit UL data, e.g., by sending a scheduling request. Rather, the UL data can be transmitted in the next one of the reoccurring time intervals.

In the illustrated concepts, the allocated UL radio resources indicated by the IUA-UL grant are assumed to be utilized in a conditional manner. Specifically, for each of the time intervals the communication device selects between an active mode and an inactive mode. In the active mode, the communication device performs a UL transmission on the allocated UL radio resources indicated by the IUA-UL grant. Conditions triggering the selection of the active mode may be a need to send UL data by the communication device or a need to send a BSR by the communication device. In the inactive mode, the communication device performs no UL transmission on the allocated UL radio resources indicated by the IUA-UL grant. The cellular network expects this behavior of the communication device and correspondingly selects between the active mode and the inactive mode. Specifically, the cellular network may detect that the communication device performed a UL transmission on the UL radio resources indicated by the IUA-UL grant and select the active mode to receive the UL transmission. If the UL transmission is received successfully, the cellular network may acknowledge this by sending a positive acknowledgement (ACK) to the communication device. If the UL transmission not received successfully, the cellular network may notify this by sending a negative acknowledgement (NACK) to the communication device. For example, sending of such ACKs or NACKs may be performed on the basis of a HARQ (Hybrid Automatic Repeat Request) protocol, e.g., as defined for the LTE radio access technology. Further, the cellular network may detect that the communication device performed a UL transmission on the UL radio resources indicated by the IUA-UL grant and select the inactive mode. In the latter case, the cellular network may refrain from attempting to receive any UL transmission on the UL radio resources indicated by the IUA-UL grant or taking any further action concerning such UL transmission, e.g., sending of acknowledgements.

By the conditional utilization of the UL radio resources indicated by the IUA-UL grant, it can be avoided that the communication device needs to perform a UL transmission in each time interval with UL radio resources allocated by the IUA-UL grant, which allows for energy efficient operation of the communication device and may also avoid unnecessary interference due to the UL transmissions on the UL radio resources indicated by the IUA-UL grant.

FIG. 1 illustrates exemplary elements which may be involved in implementing a corresponding control of a UL scheduling process. As an example of a communication device which may connect to the cellular network, FIG. 1 illustrates a UE 10. The UE 10 may correspond to a mobile phone, a smartphone, a computer with wireless connectivity, or the like. As an example of a node of the cellular network which is responsible for controlling radio transmission by the UE 10, FIG. 1 illustrates a base station 100. In accordance with the assumed utilization of the LTE radio access technology, the base station 100 will in the following also be referred to as eNB. The eNB 100 is assumed to be responsible for performing the scheduling of UL transmissions, in particular providing the IUA-UL grants and providing the D-UL grants.

It is to be understood that also other nodes may be involved in controlling at least a part of the UL scheduling process. For example, when utilizing the UMTS radio access technology, a control node referred to as RNC (Radio Network Controller) could implement similar functionalities as explained for the eNB 100.

Figure 2:
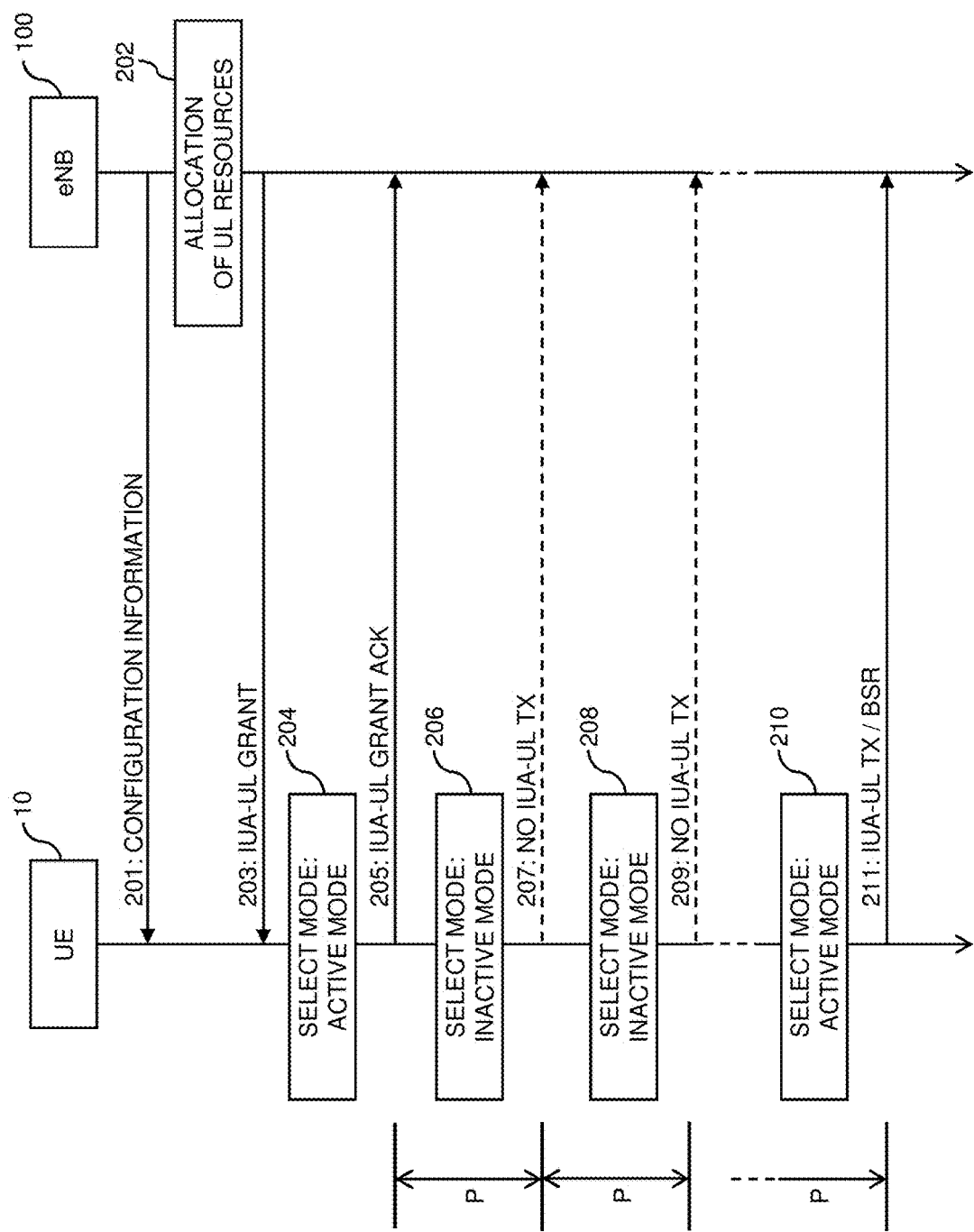
FIG. 2 schematically illustrates an exemplary process for performing UL radio transmissions according to an embodiment of the invention.

FIG. 2 shows an exemplary processes of performing UL transmissions on the basis of the IUA-UL grant. The processes of FIG. 2 involve the UE 10 and the eNB 100.

As illustrated, the eNB 100 may send configuration information 201 to the UE 10. The configuration information 201 may for example indicate radio resources of a UL control channel which are allocated to the UE 10, e.g., radio resources of a PUCCH (Physical UL Control Channel). Further, the configuration information could also provide various other kinds of information for establishing connectivity between the UE 10 and the eNB 100. The configuration information 201 may also indicate a configuration to be utilized by the UE 10 for various kinds of reporting to the cellular network, e.g., reporting of Channel State Information (CSI) or conditions for triggering a BSR. The configuration information 201 may for example be sent in an RRC (Radio Resource Control) message or by some other form of control signaling, e.g., in an MIB (Master Information Block) or SIB (System Information Block).

At step 202, the eNB 100 may allocate UL radio resources to the UE 10. Specifically, the eNB 100 allocates these UL radio resources in reoccurring time intervals to the UE 10, e.g., in each subframe or in some other predefined sequence of subframes, such as in every second subframe, every third subframe, every fourth subframe, or the like. These UL radio resources may be radio resources of a PUSCH (Physical UL Shared Channel).

The eNB 100 then sends an IUA-UL grant 203 to the UE 10. The IUA-UL grant 203 may be sent on the PDCCH. The IUA-UL grant 203 indicates the UL radio resources allocated at step 202. For example, the allocated UL radio resources may be indicated in terms of one or more resource blocks (RBs). Further, the IUA-UL grant 203 may also indicate a periodicity in which the allocated UL radio resources reoccur. Alternatively, such periodicity could also be indicated by separate control information, e.g., the control information 201. In FIG. 2, the periodicity in which the allocated UL radio resources reoccur is indicated by P, corresponding to a time offset between two time intervals with UL radio resources allocated by the IUA-UL grant. In the following this time interval is also referred to as IUA period.

The IUA-UL grant 203 may be provided with an indicator which allows the UE 10 to distinguish the IUA-UL grant 203 from other types of grants, e.g., a D-UL grant. Such indicator may for example be included in an information field of the IUA-UL grant 203. Further, the indicator could also be provided by utilizing a specific identifier to address the IUA-UL grant to the UE 10, e.g., a specific C-RNTI (Cell Radio Network Temporary Identity). For example, a one C-RNTI could be provided for addressing IUA-UL grants to the UE 10, and one or more other C-RNTIs could be provided for addressing other types of IUA-UL grants to the UE 10, such as D-UL grants.

After receiving the IUA-UL grant 203, the UE 10 may enter an IUA operation, in which the UL radio resources indicated by the IUA UL grant 203 may be instantly utilized for performing low latency UL transmissions. In the IUA operation, the UE 10 checks for each of the time intervals with the allocated UL resources whether a condition for selecting the active mode is met. If this is the case, the UE 10 selects the active mode and performs a UL transmission on the allocated UL radio resources. If this is not the case, the UE 10 selects the inactive mode and performs no transmission on the allocated UL radio resources.

As illustrated by step 204, in the first time interval with allocated UL resources indicated by the IUA-UL grant 203, the UE 10 may select the active mode to perform a UL transmission on the allocated resources which includes an acknowledgement (IUA-UL grant ACK) 205 of receipt of the IUA-UL grant 203 by the UE 10. The IUA-UL grant acknowledgement 205 may confirm to the eNB 100 that the UE 10 entered the IUA operation, which for example means that the eNB 100 should expect a UL transmission on the UL radio resources indicated by the IUA-UL grant 203. The IUA-UL grant acknowledgement 205 may for example correspond to a IUA-UL transmission with data padding, i.e., without actual UL data but a predefined or random data pattern, such as only zeros.

As further illustrated by steps 206 and 208, in some time intervals with allocated UL radio resources indicated by the IUA-UL grant 203, the UE 10 may select the inactive mode. In this case, the UE 10 performs no UL transmission on the allocated UL radio resources indicated by the IUA-UL grant (no IUA-UL TX), as indicated by the dashed arrows 207 and 209.

As further illustrated by step 210, in some time intervals with allocated UL radio resources indicated by the IUA-UL grant 203, the UE 10 may select the active mode to perform a UL transmission on the allocated UL radio resources indicated by the IUA-UL grant (IUA-UL TX) 211. Selecting the active mode at step 210 may for example be triggered by a need for transmission of UL data by the UE 10. In such case, the IUA-UL transmission 211 may include at least a part of this UL data and a BSR. Selecting the active mode at step 210 could also be triggered by a need to send a BSR by the UE 10, without a need for transmission of UL data. In such case, the IUA-UL transmission 211 may include the BSR, but no UL data.

Figure 3:
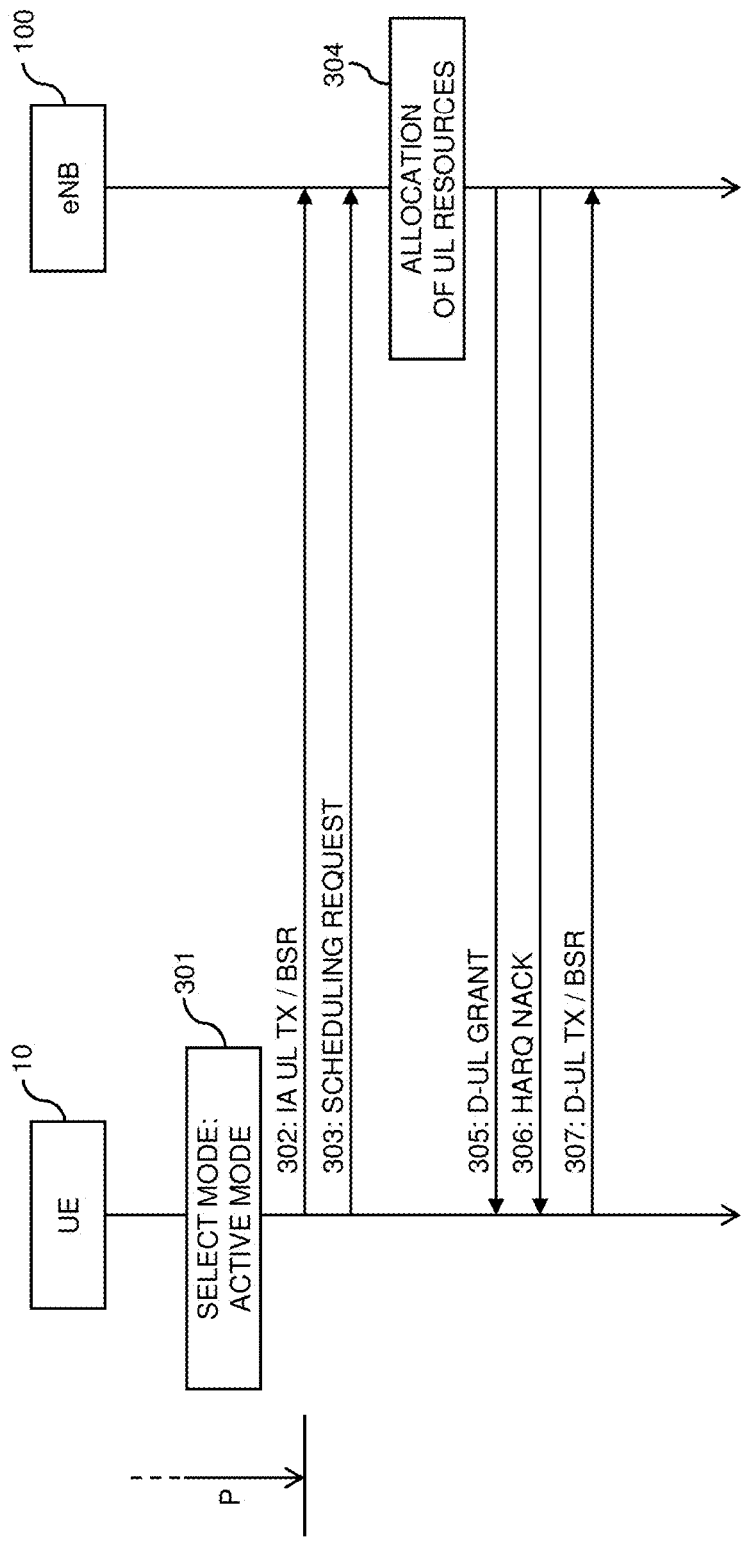
FIG. 3 schematically illustrates further exemplary process for performing UL radio transmissions according to an embodiment of the invention.

FIG. 3 shows further exemplary processes of performing UL transmissions on the basis of the IUA-UL grant. Also the processes of FIG. 3 involve the UE 10 and the eNB 100. The processes of FIG. 3 may for example be performed in the IUA operation of the UE 10, after receiving the IUA-UL grant.

As indicated by step 301, in a certain time interval with allocated UL radio resources indicated by the IUA-UL grant, the UE 10 may select the active mode to perform a UL transmission of UL data on the allocated UL radio resources indicated by the IUA-UL grant, in FIG. 3 illustrated by IUA-UL transmission 302 (which may also include a BSR).

In addition to sending the IUA-UL transmission 302, the UE 10 may also send a scheduling request 303 to the eNB 100.

As indicated by step 304, in response to the scheduling request 303 the eNB 100 performs allocation of further UL radio resources 304 to the UE 10. The eNB 100 sends a D-UL grant 305 to the UE 10 which indicates these further allocated UL radio resources.

In the processes of FIG. 3, it is further assumed that the IUA-UL transmission 302 could not be successfully received by the eNB 100, e.g., due to poor radio link adaptation between the UE 10 and the eNB 100. Accordingly, the eNB 100 notifies the UE 10 of the failed reception by sending a HARQ NACK 306.

The HARQ NACK 306 causes the UE 10 to retransmit the UL data on the further allocated UL radio resources indicated by the D-UL grant 305, as indicated by dynamic UL transmission (D-UL TX) 307. Similar to IUA-UL transmission 302, also the D-UL transmission 307 may include a BSR.

In the processes of FIG. 3, sending the scheduling request 305 together with the initial IUA-UL transmission 302 allows for avoiding additional delays if the IUA-UL transmission fails, i.e., for achieving a similar performance with respect to latency as in the case of utilizing only scheduling request based dynamic scheduling.

Figure 4:
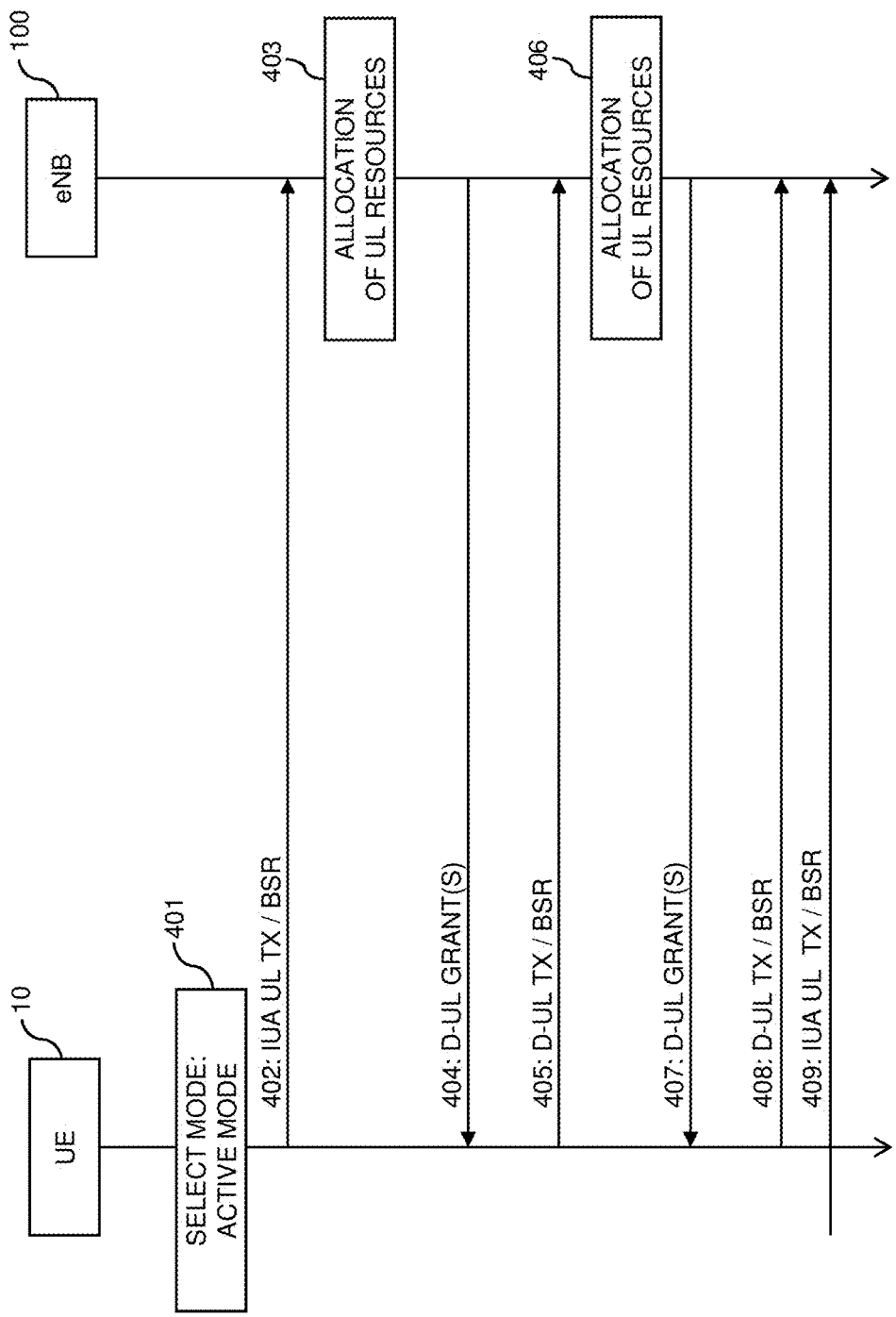
FIG. 4 schematically illustrates further exemplary process for performing UL radio transmissions according to an embodiment of the invention.

FIG. 4 shows further exemplary processes of performing UL transmissions on the basis of the IUA-UL grant. Also the processes of FIG. 4 involve the UE 10 and the eNB 100. The processes of FIG. 4 may for example be performed in the IUA operation of the UE 10, after receiving the IUA-UL grant.

As indicated by step 401, in a certain time interval with allocated UL radio resources indicated by the IUA-UL grant, the UE 10 may select the active mode to perform a UL transmission of UL data on the allocated UL radio resources indicated by the IUA-UL grant, in FIG. 4 illustrated by IUA-UL transmission 402. As illustrated, the IUA-UL transmission 402 also includes a BSR. The BSR indicates an amount of further UL data pending for transmission by the UE 10.

As indicated by step 403, on the basis of the BSR in IUA-UL transmission 402, the eNB 100 performs allocation of further UL radio resources to the UE 10. The eNB 100 sends a D-UL grant 404 to the UE 10 which indicates these further allocated UL radio resources.

The UE 10 may then transmit at least a part of the further UL data on the further allocated UL radio resources indicated by the D-UL grant 404, as indicated by D-UL transmission 405. Also D-UL transmission 405 includes a BSR which indicates an amount of further UL data pending for transmission by the UE 10.

As indicated by step 406, on the basis of the BSR in D-UL transmission 405, the eNB 100 performs allocation of further UL radio resources to the UE 10. The eNB 100 sends a further D-UL grant 407 to the UE 10 which indicates these further allocated UL radio resources.

The UE 10 may then transmit at least a part of the further UL data on the further allocated UL radio resources indicated by the D-UL grant 407, as indicated by D-UL transmission 408. Again, D-UL transmission 408 includes a BSR which indicates an amount of further UL data pending for transmission by the UE 10.

As further illustrated, the UE 10 may also perform a further IUA-UL transmission 409 at the later time interval with allocated UL radio resources indicated by the IUA-UL grant. Again, IUA-UL transmission 409 includes a BSR which indicates an amount of further UL data pending for transmission by the UE 10.

As can be seen from the processes of FIG. 4, the BSR in a IUA-UL transmission may trigger allocation of further UL radio resources which may then be indicated in a D-UL grant. These further allocated UL radio resources may then be used alternatively or in addition to the UL radio resources indicated by the IUA-UL grant for transmission of UL data. In this way, the amount of UL radio resources allocated to the UE 10 may be dynamically adapted to the current UL traffic demand of the UE 10, while at the same time allowing fast initial access to UL radio resources.

Figure 5:
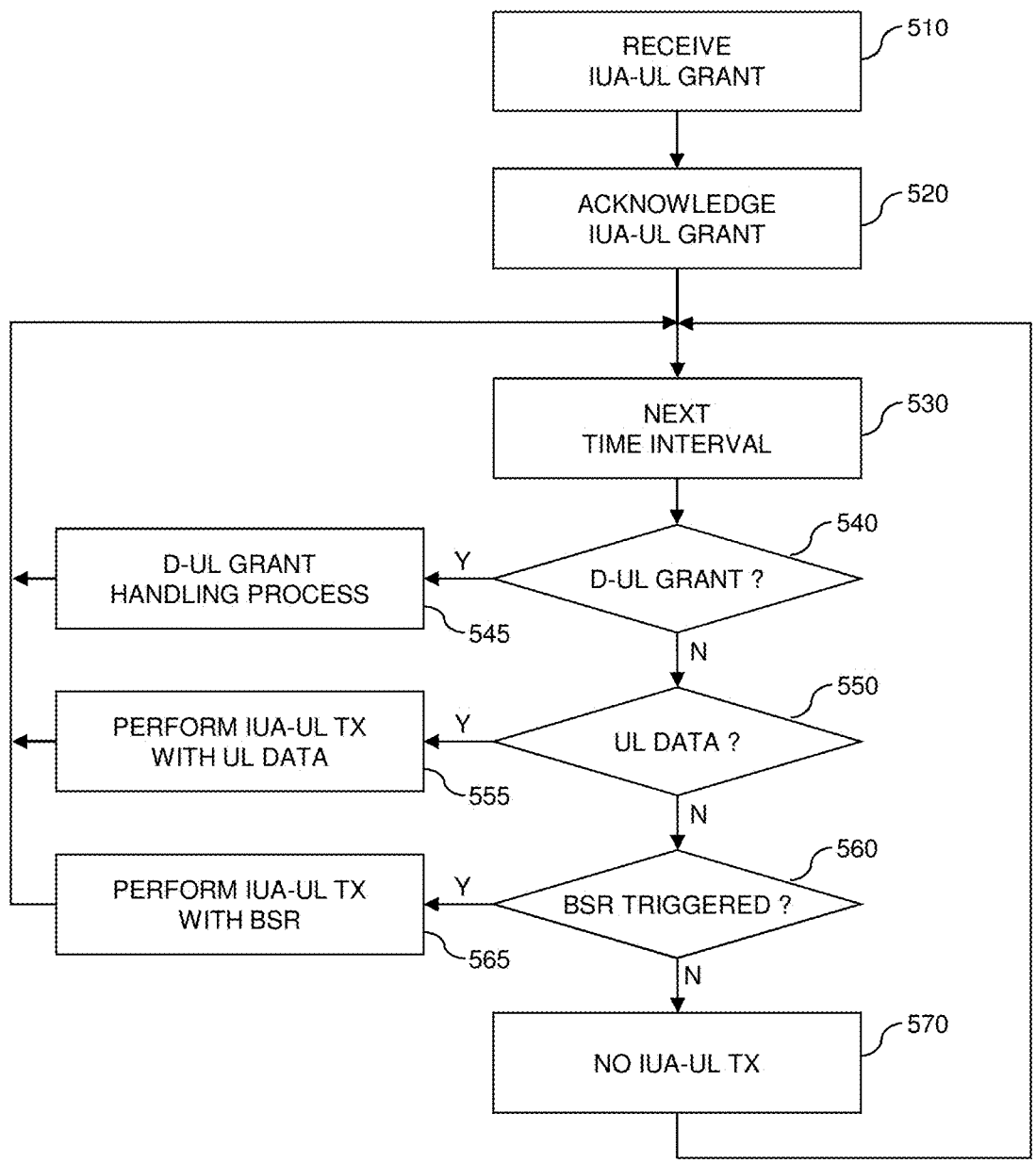
FIG. 5 shows a flowchart for illustrating a method according to an embodiment of the invention, which may be implemented by a communication device.

FIG. 5 shows a flowchart for illustrating a method which may be utilized for controlling a communication device, e.g., the UE 10, to operate in accordance with the above-mentioned concepts. If a processor based implementation of the communication device is used, the steps of the method may be performed by one or more processors of the communication device. For this purpose, the processor(s) may execute correspondingly configured program code. Further, at least some of the corresponding functionalities may be hardwired in the processor(s).

At step 510, the communication device receives the IUA-UL grant. The communication device may receive the IUA-UL grant on a DL control channel, e.g., on the PDCCH of the LTE radio access technology. The IUA-grant indicates UL radio resources allocated to the communication device in reoccurring time intervals, e.g., corresponding to a periodic pattern of subframes.

As indicated by step 520, the communication device may then acknowledge receipt of the IUA-UL grant, e.g., by performing a UL transmission filled by padding on the allocated UL radio resources indicated in the IUA-UL grant.

The communication device may then enter the IUA operation and perform the following actions when reaching a next time interval with allocated UL radio resources indicated in the IUA-UL grant, as indicated by step 530.

At step 540, the communication device may check if a D-UL grant was received by the communication device. If this is the case, the utilization of the D-UL grant may be prioritized over the utilization of the IUA-UL grant, corresponding to an overriding of the IUA-UL grant with the D-UL grant, and the method may proceed with step 545, as indicated by branch "Y".

At step 545, further UL radio resources indicated by the D-UL grant may be utilized for performing a D-UL transmission. If no UL data are available for transmission, the D-UL transmission may include a BSR, but no UL data.

For the next time interval, the method may then return to step 530.

If at step 540 no D-UL grant was received by the communication device, the method may proceed with step 550, as indicated by branch "N".

At step 550, the communication device may check if UL data need to be transmitted by the communication device. If this is the case, the method may proceed with step 555, as indicated by branch "Y".

At step 555, the communication device selects the active mode and performs an IUA-UL transmission on the UL radio resources indicated in the IUA-UL grant. This IUA-UL transmission includes at least a part of the UL data and may further include a BSR. For the next time interval, the method may then return to step 530.

If at step 550 there is no need for transmission of UL data, the method may proceed with step 560, as indicated by branch "N".

At step 560, the communication device may check whether a trigger condition for sending a BSR is fulfilled. If this is the case, the method may proceed with step 565, as indicated by branch "Y".

At step 565, the communication device selects the active mode and performs an IUA-UL transmission on the UL radio resources indicated in the IUA-UL grant. This IUA-UL transmission includes a BSR, but no UL data. For the next time interval, the method may then return to step 530.

If at step 560 no trigger condition for sending a BSR is fulfilled, the method may proceed with step 570, as indicated by branch "N".

At step 570, the communication device selects the inactive mode and performs no IUA-UL transmission on the UL radio resources indicated in the IUA-UL grant. For the next time interval, the method may then return to step 530.

Figure 6:
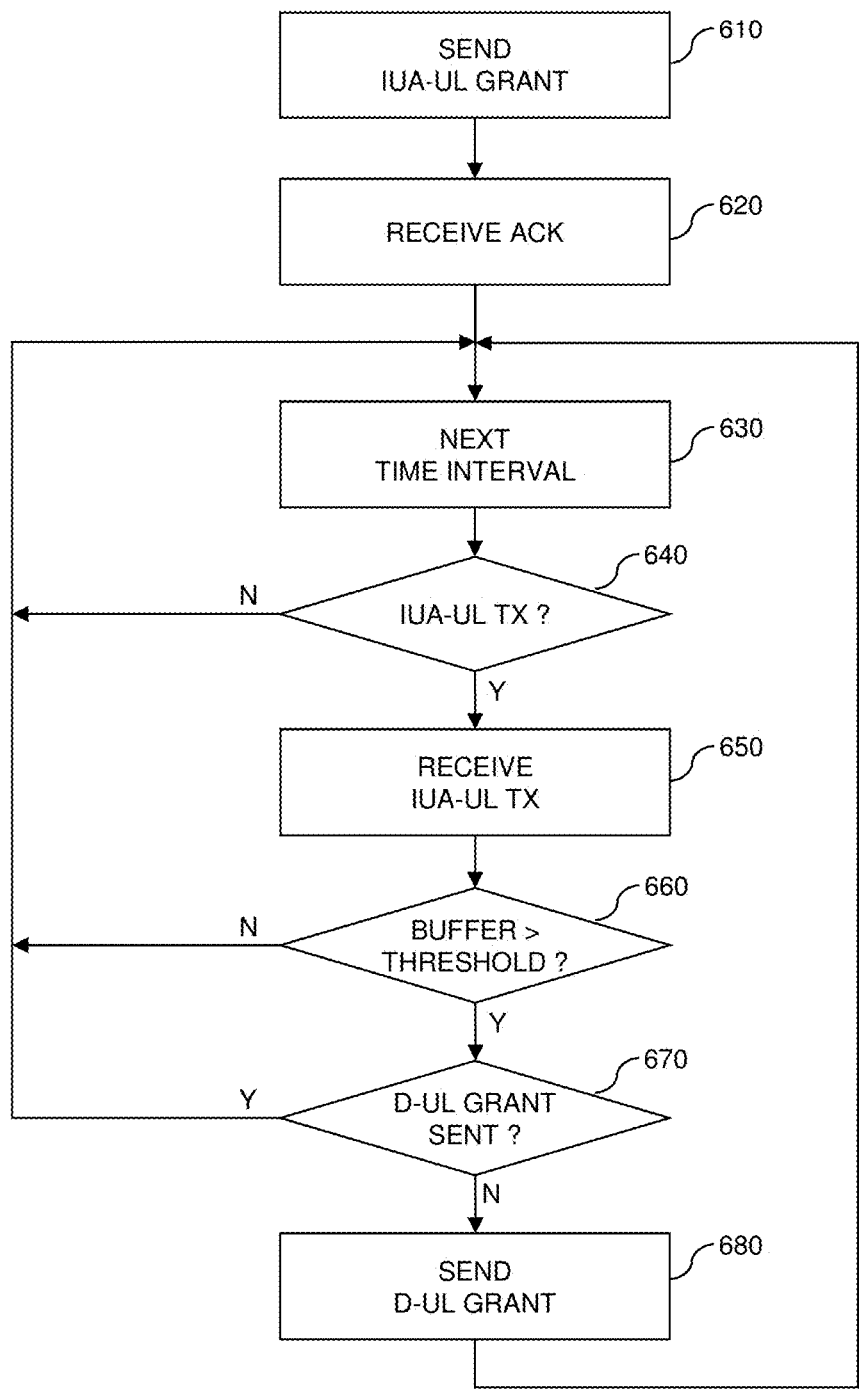
FIG. 6 shows a flowchart for illustrating a method according to an embodiment of the invention, which may be implemented by a network node.

FIG. 6 shows a flowchart for illustrating a method which may be implemented by a node of the cellular network, e.g., the eNB 100, to control a communication device in accordance with the above-mentioned concepts. If a processor based implementation of the node is used, the steps of the method may be performed by one or more processors of the node device. For this purpose, the processor(s) may execute correspondingly configured program code. Further, at least some of the corresponding functionalities may be hardwired in the processor(s).

At step 610, the node sends the IUA-UL grant to the communication device. The node may send the IUA-UL grant on a DL control channel, e.g., on the PDCCH of the LTE radio access technology. The IUA-grant indicates radio resources allocated to the communication device in reoccurring time intervals, e.g., corresponding to a periodic pattern of subframes.

As indicated by step 620, the node may then receive an acknowledgement of receipt of the IUA-UL grant by the communication device. For example, the acknowledgement may be indicated by a padded UL transmission on the allocated UL radio resources indicated in the IUA-UL grant.

The node may then enter the IUA operation and perform the following actions when reaching a next time interval with allocated UL radio resources indicated in the IUA-UL grant, as indicated by step 630.

At step 640, the node may check if the communication device performed an IUA-UL transmission on the UL radio resources indicated in the IUA-UL grant. For this purpose, the node may for example detect a signal level on the UL radio resources. If the signal level is above a threshold, the node may determine that the communication device performed an IUA-UL transmission on the UL radio resources indicated in the IUA-UL grant.

If at step 640 no IUA-UL transmission on the UL radio resources indicated in the IUA-UL grant is detected, the method may return to step 630 for the next time interval, as indicated by branch "N".

If at step 640 an IUA-UL transmission on the UL radio resources indicated in the IUA-UL grant is detected, the method may continue with step 650, as indicated by branch "Y".

At step 650, the node may receive the IUA-UL transmission. As mentioned, above the IUA-UL TX may also include a BSR. Further, the IUA-UL transmission may include UL data.

At step 660, the node may check if the BSR indicates that an amount of UL data to be transmitted by the communication device is above threshold. The threshold may be preconfigured or may be calculated in a dynamic manner, e.g., on the basis of a HARQ roundtrip time $T_{HRTT}$, in units of the time periods with allocated UL resources indicated by the IUA-UL grant (i.e., in units of the IUA period), and a size $S_{IUAG}$ of the IUA-UL grant, i.e., the data capacity of the allocated UL radio resources indicated by the IUA-UL grant. For example, the threshold may be calculated according to:

$$\text{Threshold} = THRTT * SIUAG + A, \quad (1)$$

where A may be a constant or function that may be used to ensure that sending a D-UL grant is only triggered if the amount of UL data still to be sent after the HARQ roundtrip time $T_{HRTT}$ is not too small.

If at step 660 the amount of UL data to be transmitted is not above the threshold, the method may return to step 630 for the next time interval, as indicated by branch "N".

If at step 660 the amount of UL data to be transmitted is above the threshold, the method may continue with step 670, as indicated by branch "Y".

At step 670, the node may check if a D-UL grant was already sent to the communication device, but not yet utilized. If this is the case, the method may return to step 630 for the next time interval, as indicated by branch "Y".

If at step 670 it is found that there is no D-UL grant which was sent to the communication device, but not yet utilized, the method may continue with step 680 as indicated by branch "N".

At step 680, the node may send a new D-UL grant to the communication device. The size $S_{DG}$ of this new D-UL grant may be determined on the basis of amount of data $V_B$ indicated in the BSR and the size $S_{IUAG}$ of the IUA-UL grant, e.g., according to:

$$S_{DG} = V_B - T_{HRTT} * S_{IUAG}. \quad (2)$$

After sending the D-UL grant at step 680, the method may return to step 630 for the next time interval.

By the checks in steps 660 and 670 of FIG. 6, it can be avoided that a D-UL grant is sent to the communication device which is actually not required. Specifically, the check of step 660 may ensure that the D-UL grant is sent if transmission of the UL data is on the UL radio resources indicated in the IUA-UL grant is not possible before the D-UL grant is received by the communication device.

Figure 7:
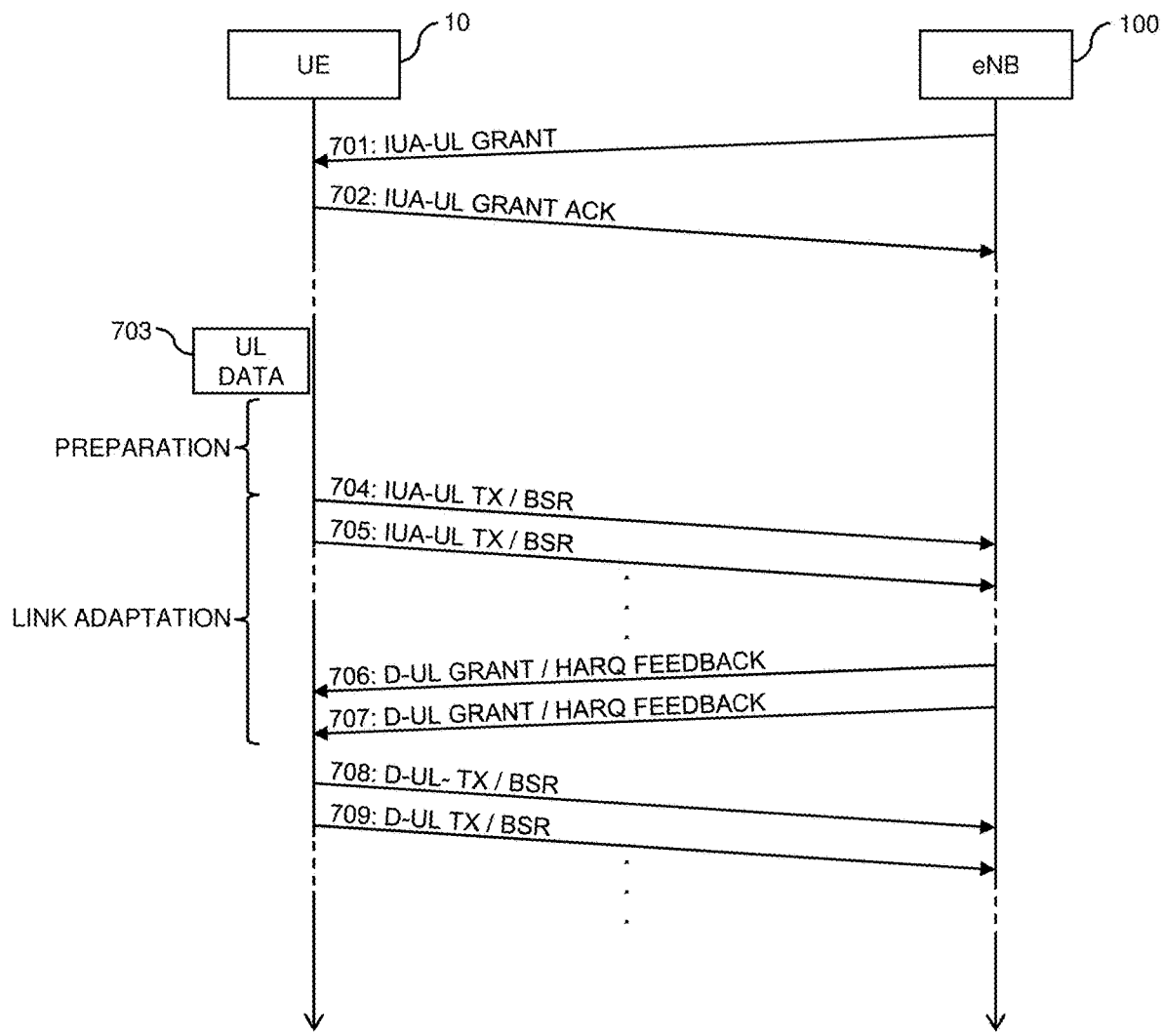
FIG. 7 schematically illustrates an exemplary sequence of processes when for performing UL radio transmissions according to an embodiment of the invention.

FIG. 7 shows further a typical sequence of processes for performing UL transmissions on the basis of the IUA-UL grant. Also the processes of FIG. 7 involve the UE 10 and the eNB 100.

In the processes of FIG. 7, initially the eNB 100 sends a IUA-UL grant 701 to the UE 10. The IUA-UL grant 701 indicates UL radio resources allocated to the UE 10 in reoccurring time intervals. In the example of FIG. 7, it is assumed that these IUA UL radio resources are allocated in each subframe. The IUA-UL grant 701 may be sent on the PDCCH.

The UE 10 then performs an initial IUA-UL transmission with an IUA-UL grant acknowledgement 702. If the UE 10 has no UL data to transmit, the IUA-UL grant acknowledgement 702 may be a IUA-UL transmission with padding. The IUA-UL grant acknowledgement 702 confirm receipt of the IUA-UL grant 701 to the eNB 100. If the IUA-UL grant acknowledgement 702 is not received by the eNB 100, the eNB 100 may resend the IUA-UL grant 701. The usage of the IUA-UL grant acknowledgement 702 is optional and may for example be configured during connection configuration, e.g., by the control information 201 of FIG. 2. The IUA-UL grant 701 may be valid for an open time period, e.g., until de-configured by the eNB 100. Alternatively, also a validity period could be indicated together with the IUA-UL grant 701 or in separate control information, such as the control information 201 of FIG. 2.

When UL data for transmission becomes available at the UE 10, the UE 10, as indicated by 703, the UE 10 may prepare one or more IUA-UL transmissions on the allocated UL radio resources of the IUA-UL grant. FIG. 7 also illustrates a corresponding processing time, e.g., associated with layer 2 and layer 1 processing. If a BSR is triggered, the UE 10 may also add the BSR to the IUA-UL transmissions.

The UE 10 then sends the IUA-UL transmission(s) 704, 705 at the next time intervals with UL radio resources indicated by the IUA-UL grant.

When the eNB 100 receives the IUA-UL transmissions 704, 705 it may evaluate the included BSR to decide whether sending of one or more D-UL grants to the UE 10 is appropriate, e.g., using processes as explained in connection with FIG. 6.

In the illustrated example, the eNB 100 sends D-UL grants 706 and 707 to the UE 10. As further illustrated, these D-UL grants 706, 707 may be accompanied by HARQ feedback with respect to the IUA-UL transmissions 704, 705.

While performing the IUA-UL transmissions 704, 705 and transmitting the D-UL grants 706, 707, the UE 10 and the eNB 100 may accomplish link adaptation of the radio link between the UE 10 and the eNB 100, e.g., by selecting a suitable modulation and coding scheme (MCS) and/or transmission power. This link adaptation phase may last for about one HARQ roundtrip time, e.g., eight subframes. After that, a higher performance may be achieved due to optimized link adaptation.

The UE 10 may then continue performing UL transmissions on the further allocated radio resources indicated by the D-UL grants 706, 707, as illustrated by D-UL transmissions 708 and 709. As illustrated, the D-UL transmissions 708, 709 may each include a BSR, so that further D-UL grants may be issued to the UE 10 as long as it has UL data for transmission.

As mentioned above, the IUA-UL grant and D-UL grants may be utilized in parallel. In particular, the IUA-UL grant may be utilized to provide a basic allocation of UL radio resources which allows for fast initial access without a preceding scheduling request. The D-UL grants may in turn be utilized provide further allocated UL radio resources if there is a higher traffic demand by the UE 10.

For achieving a more efficient utilization of the allocated UL radio resources, utilization of the D-UL grants may be prioritized over the utilization of the IUA-UL grant in time intervals where both types of grants indicate allocated UL radio resources. This prioritization may for example be achieved by performing the check of step 540 in FIG. 5.

In some scenarios, the UL radio resources indicated by a D-UL grant for a certain time interval could be overlapping with the UL radio resources indicated by the IUA-UL grant. Since in typical scenarios the D-UL grant indicates a larger amount of UL radio resources, a D-UL transmission on the UL radio resources indicated by D-UL grant may be more efficient. If at least a part of the UL radio resources indicated by the IUA-UL grant are non-overlapping with the UL radio resources indicated by the D-UL grant, it is also possible to combine these non-overlapping UL radio resources with the UL radio resources indicated by the D-UL grant and perform the UL transmission on both types of UL radio resources. An example of a corresponding scenario is illustrated in FIG. 8.

Figure 8:
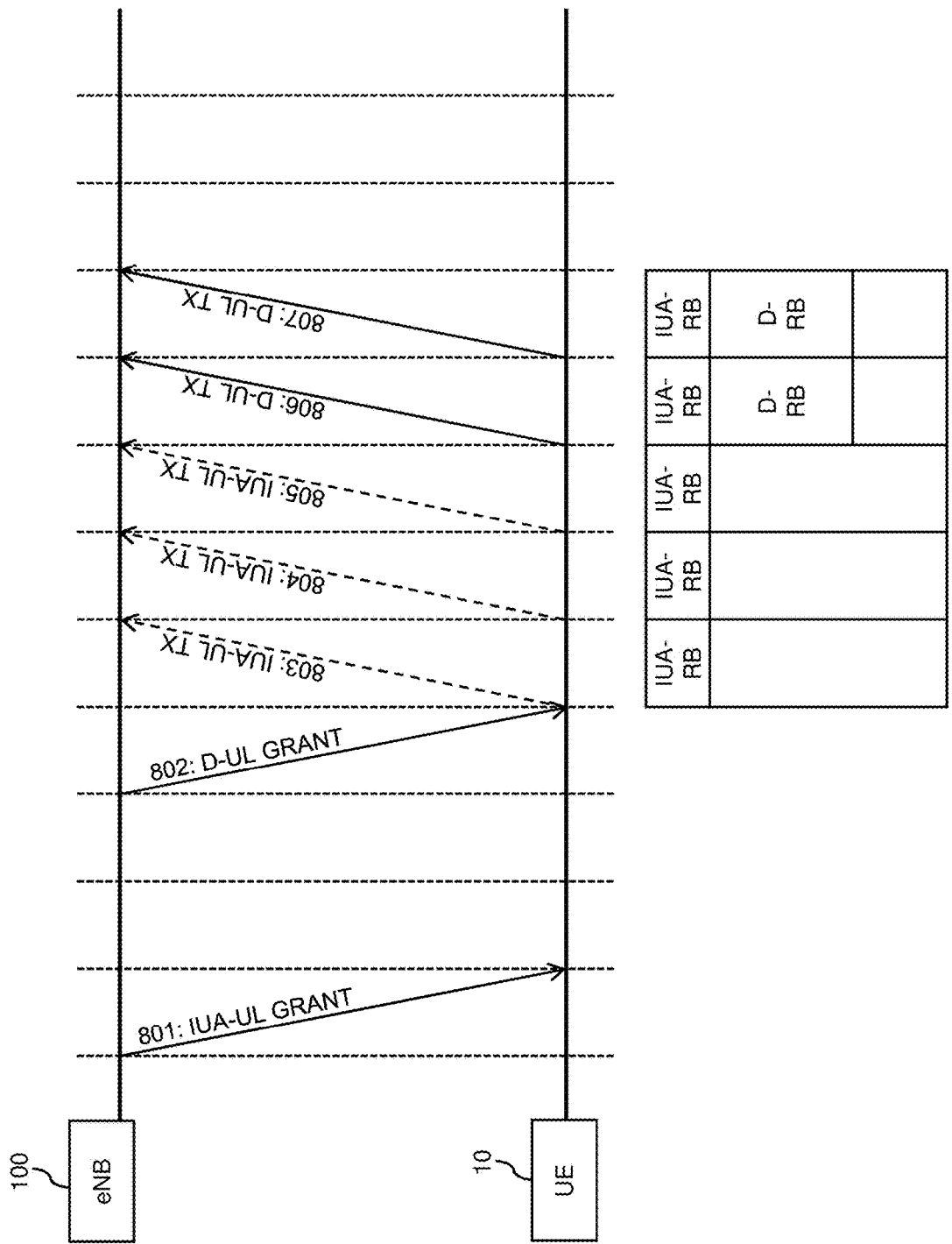
FIG. 8 illustrates an exemplary scenario in which UL radio resources from different UL grants are combined according to an embodiment of the invention.

In the scenario of FIG. 8, the eNB 100 sends IUA-UL grant 801 to the UE 10, e.g., on the PDCCH. Later, the eNB 100 sends D-UL grant 802 to the UE. Initially, the UE 10 performs IUA-UL transmissions 803, 804, 805 on UL resources indicated by the IUA-UL grant 801. In FIG. 8, these UL radio resources are referred to as IUA-RB. However, after a certain processing delay, additional utilization of the UL radio resources indicated in the D-UL grant, in FIG. 8 referred to as D-RB, becomes possible. In each TTI, the UE 10 may then perform a single D-UL transmission 806, 807 on the UL radio resources indicated in both the IUA-UL grant and the D-UL grant, i.e., on IUA-RB and D-RB. The combination of the UL radio resources can be achieved on the network side by preparing the D-UL grant 802 to cover both IUA-RB and D-RB. Further, such combination of the UL radio resources can be achieved on the UE side by adding the UL radio resources indicated in the IUA-grant 801 to the UL radio resources indicated in the D-UL grant 802 when preparing the D-UL transmissions 806, 807.

Figure 9:
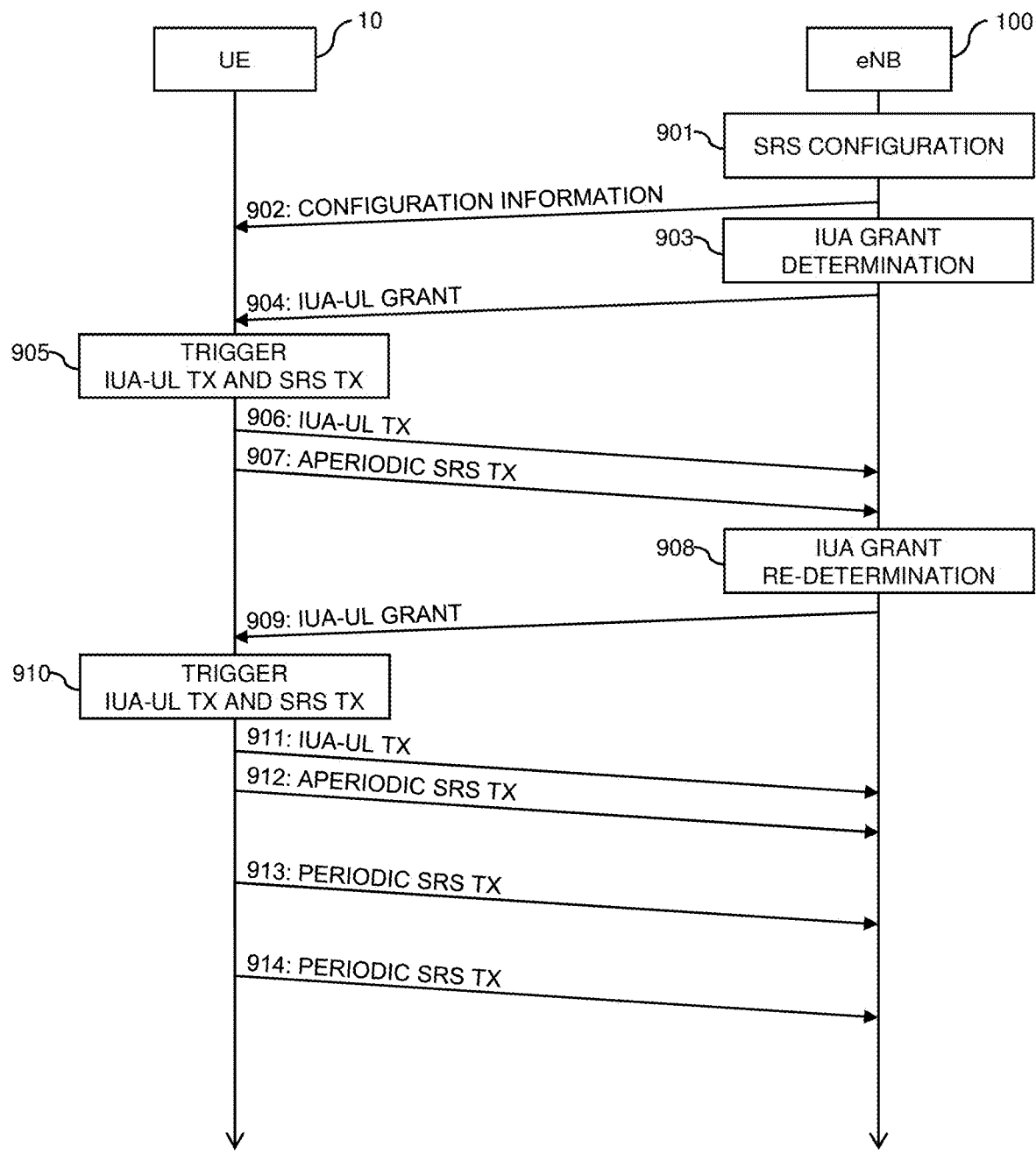
FIG. 9 illustrates exemplary processes in which sending of reference signals is controlled according to an embodiment of the invention.

The utilization of the IUA-UL grant may also be considered when configuring the transmission of reference signals, e.g., sounding reference signals (SRS), by the UE 10. Such reference signals may be utilized for UL channel quality estimation and link adaptation purposes. For example, by configuring additional reference signal transmissions, the eNB 100 may be provided with a better estimate of the UL channel quality, in particular when the UE only sparsely performs IUA-UL transmissions. An example of processes where SRS transmissions are configured for the UE 10 and utilized when performing IUA-UL transmissions is illustrated in FIG. 9.

As illustrated by step 901, the eNB 100 determines an SRS configuration for the UE 10. This may for example be performed when the UE 10 enters the cellular network or if radio connectivity of the UE 10 to the cellular network otherwise changes. The SRS configuration of step 901 may define a periodic pattern of sending periodic SRS and/or trigger events for sending aperiodic SRS. In the processes of FIG. 9, it is assumed that one such trigger events for sending aperiodic SRS is reception of a IUA-UL grant. The eNB 100 then sends configuration information 902 indicating the determined SRS configuration to the UE 10. The configuration information 902 may for example be sent in an RRC message.

As illustrated by step 903, the eNB 100 may then determine an IUA-UL grant. This determination of the IUA-UL grant may for example involve selecting UL radio resources allocated to the UE 10. The determination of the IUA-UL grant may be based on an initial assumption on the UL channel quality between the UE 10 and the eNB 100. The eNB 100 then sends the IUA-UL grant 904 to the UE 10, e.g., on the PDCCH.

As indicated by step 905, at the UE 10 receipt of the IUA-UL grant 904 triggers sending of an IUA-UL transmission 906 and a transmission of aperiodic SRS 907. The aperiodic SRS can be wideband or frequency hopping. As mentioned above, the IUA-UL transmission 906 may have the purpose of acknowledging receipt of the IUA-UL grant 904.

The aperiodic SRS transmission 907 may in turn be utilized for performing measurements to obtain a better estimate of the UL channel quality between the UE 10 and the eNB 100. This better estimate may then be utilized as a basis for re-determining the IUA-UL grant of the UE 10, as illustrated by step 908. For example, the measurement could indicate a low UL channel quality, and step 908 could involve adding further UL radio resources in the IUA-UL grant to allow for utilizing a more robust coding scheme for the IUA-UL transmissions. The eNB 100 then sends the re-determined IUA-UL grant 909 to the UE 10.

As indicated by step 910, at the UE 10 receipt of the re-determined IUA-UL grant 909 again triggers sending of an IUA-UL transmission 911 and a transmission of aperiodic SRS 912. Again, the aperiodic SRS can be wideband or frequency hopping. The IUA-UL transmission 911 may have the purpose of acknowledging receipt of the IUA-UL grant 909. The aperiodic SRS transmission 912 may be utilized for performing measurements to obtain a new estimate of the UL channel quality between the UE 10 and the eNB 100. In the scenario of FIG. 9 it is assumed that the new estimate of the UL channel quality prompts no further re-determination of the IUA-UL grant.

After that, the UE 10 may continue its IUA operation, which may also involve sending periodic SRS 913, 914 as configured at step 901. These periodic SRS may be utilized by the eNB 100 for keeping track of the UL channel quality between the UE 10 and the eNB 100 and more reliably receiving IUA-UL transmissions.

For the DL direction, the UE 10 may need to send CSI, such as CQI (Channel Quality Indicator) reports, RI (Rank Indicator) reports, or PMI (Precoding Matrix Indicator) reports to the cellular network. Such reports may also be sent in IUA-UL transmissions, or alternatively on a UL control channel, e.g., the PUCCH. An example of procedures which may utilized for considering the IUA-UL transmissions in CSI reporting is illustrated by the flowchart of FIG. 10.

Figure 10:
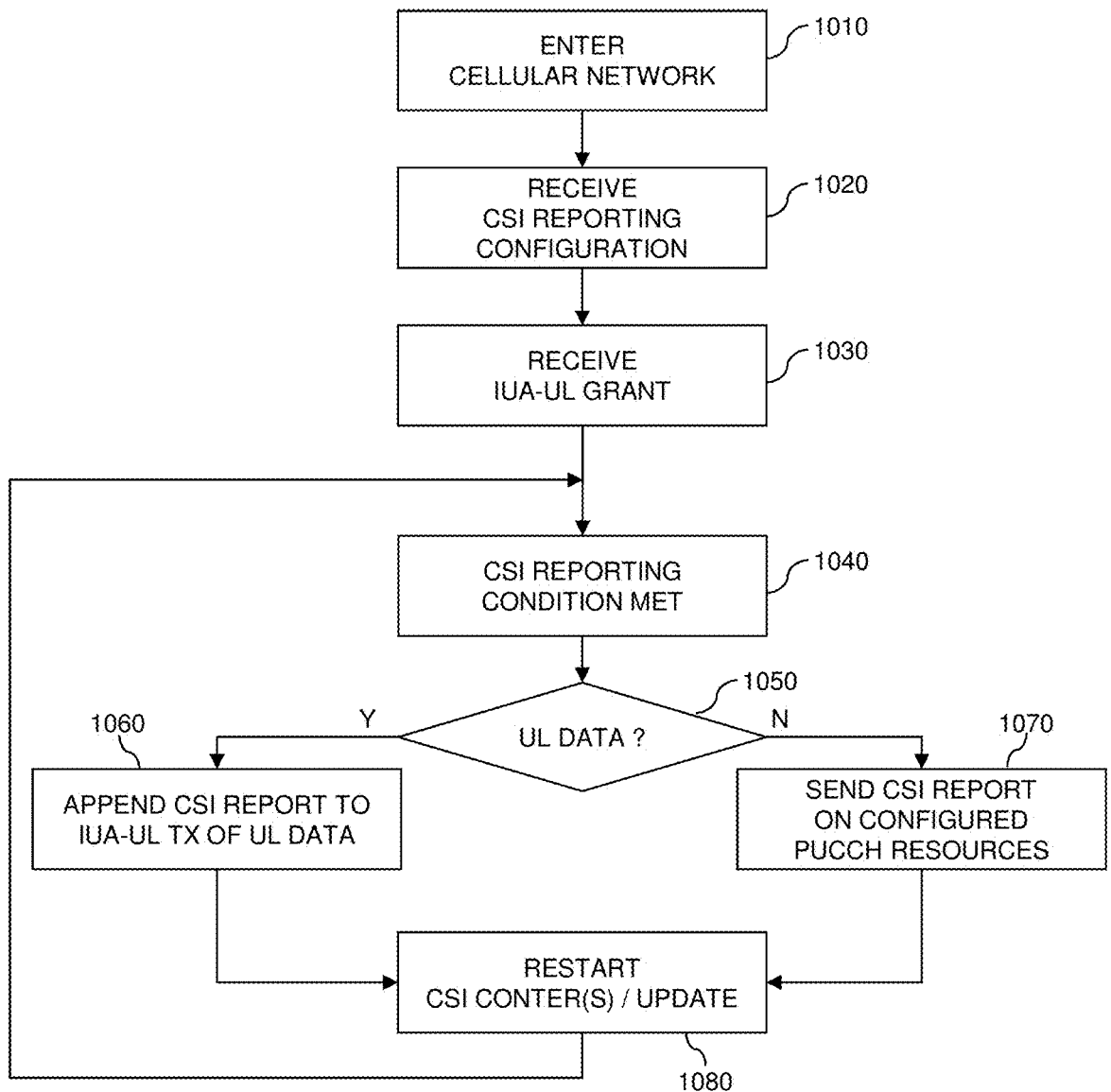
FIG. 10 shows a flowchart for illustrating procedures which may be applied for controlling reporting by a communication device according to an embodiment of the invention.

As illustrated in FIG. 10, at step 1010 the UE 10 may enter the cellular network. This may involve establishing basic connectivity between the UE 10 and the eNB 100, e.g., configuring a DL control channel, such as a PDCCH, and/or configuring a UL control channel, such as a PUCCH.

At step 1020, the UE 10 may receive a CSI reporting configuration, e.g., in configuration information from the eNB 100, such as the configuration information 201 of FIG. 2. The CSI reporting configuration may for example define one or more periodicities of sending CSI reports. Further, the CSI reporting configuration may defined resources of the UL control channel which may be utilized for sending CSI reports.

At step 1030, the UE 10 receives the IUA-UL grant, e.g., on the PDCCH. As mentioned above, the IUA-grant indicates UL radio resources allocated to the UE 10 in reoccurring TTIs, e.g., in a periodic pattern of TTIs.

The UE 10 may the enter the IUA operation and according to a CSI reporting periodicity as for example configured at step 1020, repeatedly perform the following actions:

At step 1040, the UE 10 detects that, according to the CSI reporting periodicity, a condition for sending a CSI report is met.

At step 1050, the UE 10 may then check if there are UL data for transmission by the UE 10. If this is the case, the procedures may continue with step 1060, as indicated by branch "Y". At step 1060, the UE 10 may append the CSI to a IUA-UL transmission of the UL data.

If at step 1050 there are no UL data for transmission by the UE 10, the procedures may continue with step 1070, as indicated by branch "N". At step 1070, the UE 10 may send the CSI report on a UL control channel, e.g., on resources as configured at step 1020.

After step 1060 or 1070, the procedures may continue with step 1080, where CSI counters may be reset or CSI parameters may be updated. This may for example also involve performing measurements on reference signals from the eNB 100. For the next CSI reporting period, the procedures may then return to step 1040.

The UL radio resources allocated by the IUA-UL grant can be released in various ways. For example, eNB 100 can explicitly indicate the release in control information sent to the UE 10, e.g., on a DL control channel, such as the PDCCH. The UE 10 may then stop the IUA operation and no longer utilize the UL radio resources indicated in the IUA-UL grant. Further, the UE 10 may acknowledge the release by sending an indication to the eNB 100. This may be accomplished in an explicit manner by sending corresponding control information to the eNB 100, e.g., on a UL control channel, such as the PUCCH or on a UL data channel, such as the PUSCH. The release may also be implicitly acknowledged by sending a final IUA-UL transmission with padding. The eNB 100 may interpret this IUA-UL transmission as implicit acknowledgement of the release.

As a further possibility, also sending of a D-UL grant may be utilized to trigger the release of the UL radio resources indicated by the IUA-UL grant. For example, a rule could be defined that the release is triggered if the UL radio resources indicated by the D-UL grant and the UL radio resources indicated by the IUA-UL grant are overlapping. Further, the D-UL grant could include an information field indicating that the IUA-UL grant is to be released. In some scenarios, any D-UL grant received by the UE 10 could trigger the release.

In some scenarios, the release of the IUA-UL grant may also be implicitly triggered at the UE 10. For example, the UL resources can be implicitly released after a configured number of unused occasions for performing a IUA-UL transmission. An example of a corresponding scenario is illustrated in FIG. 11.

Figure 11:
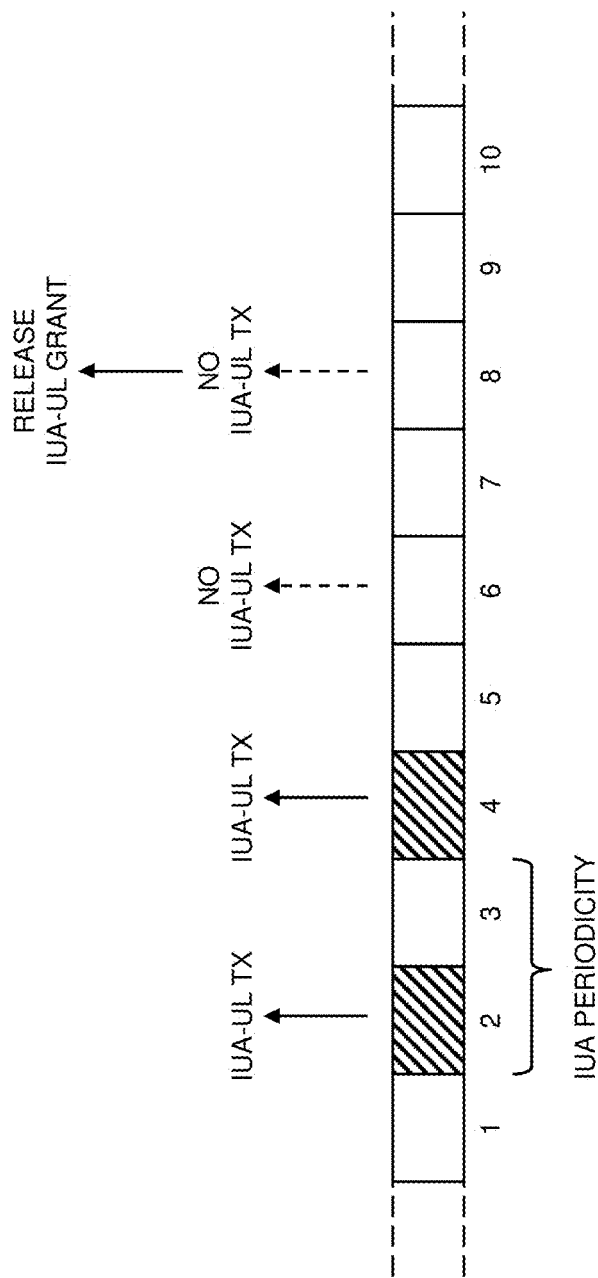
FIG. 11 illustrates an exemplary scenario in which release of a UL grant is controlled according to an embodiment of the invention.

In the scenario of FIG. 11, it is assumed that the IUA-UL grant allocates UL radio resources in every second TTI (TTI 2, 4, 6, 8, . . . ). Further, utilization of a release rule is assumed, according to which the UL radio resources indicated by the IUA-UL grant are released after two unused occasions for performing a IUA-UL transmission. The TTIs which are utilized for sending a IUA-UL transmission are shown as shaded boxes. As can be seen, IUA-UL transmissions are performed in TTIs 2 and 4, while no IUA-UL transmissions are performed in TTIs 6 and 8. Accordingly, since the occasions for performing an IUA-UL transmissions in TTI 6 and 8 were left unused, in TTI 8 the UE 10 releases the UL radio resources indicated by the IUA-UL grant.

As another example of a release rule, the UL resources may be implicitly released when a certain count of unused IUA-UL transmission occasions is reached after a timer expired which had been started, e.g., when the last UL transmission happened or when no UL data was available anymore. This way, both potential new UL data that may become available in a given amount of time as well as a number of occasions to use the UL radio resources of the IUA-UL grant resources after the timer expiry may be considered in combination.

As another example of a release rule, a timer may be started when the IUA-UL grant is received, and the UL radio resources of the IUA-UL grant may be released upon expiry of this timer. Alternatively, instead of utilizing a timer, occasions for performing IUA-UL transmissions could be counted (from the receiving the IUA-UL grant) and when a configured number is reached, the UL radio resource of the IUA-UL grant may be released.

As another example of a release rule, when counting the number of unused occasions for performing an IUA-UL transmission, those occasions in which D-UL transmissions were performed (overriding the IUA-UL grant) may be left uncounted. An example of a corresponding scenario is illustrated in FIG. 12.

Figure 12:
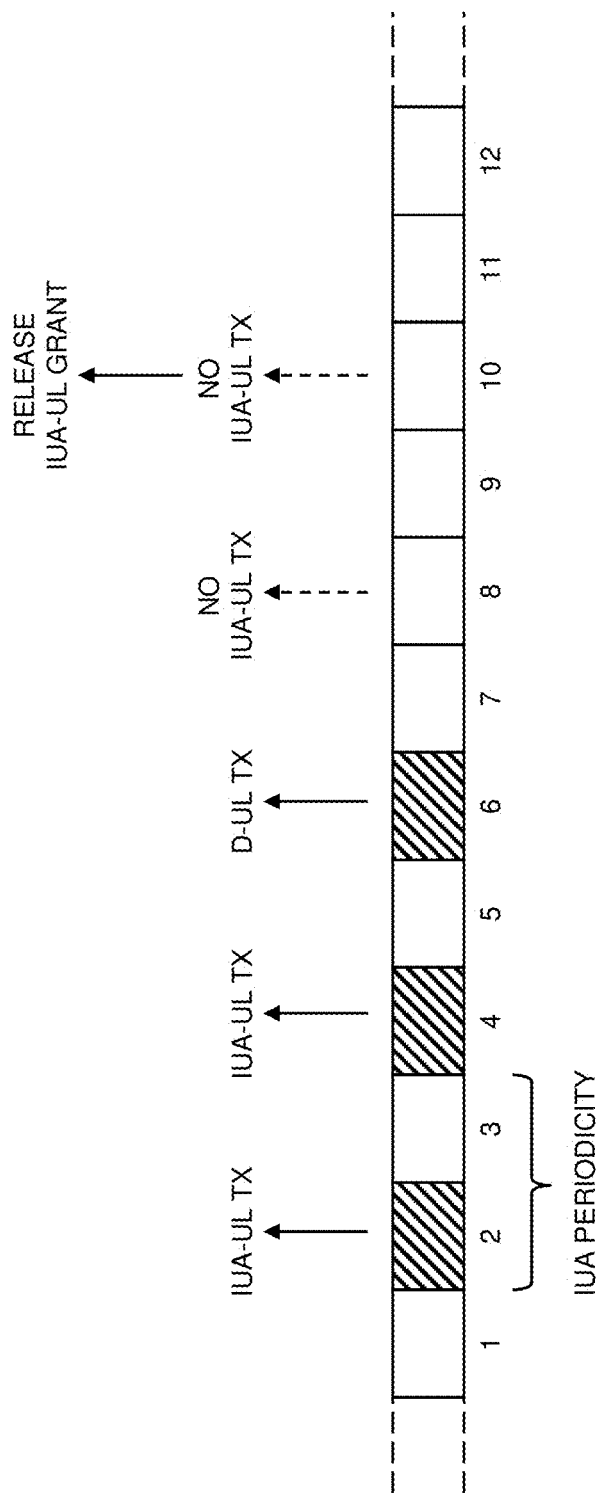
FIG. 12 illustrates a further exemplary scenario in which release of a UL grant is controlled according to an embodiment of the invention.

In the scenario of FIG. 12, it is assumed that the IUA-UL grant allocates UL radio resources in every second TTI (TTI 2, 4, 6, 8, . . . ). Further, utilization of a release rule is assumed, according to which the UL radio resources indicated by the IUA-UL grant are released after two unused occasions for performing a IUA-UL transmission, not counting those occasions in which the IUA-UL grant was overridden by a D-UL grant for the same TTI. The TTIs which are utilized for sending a IUA-UL transmission or D-UL transmission are shown as shaded boxes.

As illustrated in FIG. 12, a D-UL grant overrides the IUA-UL grant in TTI 6. Still, the UL radio resources of the IUA-UL grant are only released in subframe 10, i.e., after two unused occasions for performing a IUA-UL transmission, where TTI 6 is not regarded as an unused occasion for performing a IUA-UL transmission.

As another example of a release rule, a D-UL grant overriding the IUA-UL grant may trigger the release. An example of a corresponding scenario is illustrated in FIG. 13.

Figure 13:
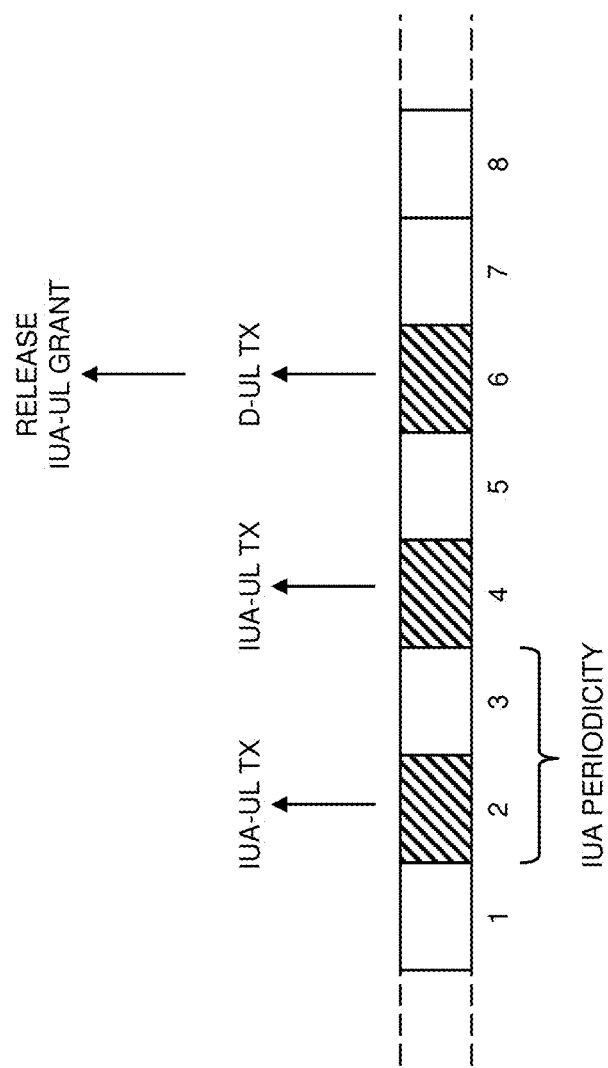
FIG. 13 illustrates a further exemplary scenario in which release of a UL grant is controlled according to an embodiment of the invention.

In the scenario of FIG. 13, it is assumed that the IUA-UL grant allocates UL radio resources in every second TTI (TTI 2, 4, 6, 8, . . . ). Further, utilization of a release rule is assumed, according to which the UL radio resources indicated by the IUA-UL grant are released by a D-UL grant overriding the IUA-UL grant. As illustrated in FIG. 13 a D-UL grant overrides the IUA-UL grant in TTI 6. Accordingly, the UL radio resources of the IUA-UL grant are released in TTI 6.

Irrespective of the applied release rule, the UE 10 may indicate the release to the eNB 100. For example, this may be accomplished in an explicit manner by sending corresponding control information to the eNB 100, e.g., on a UL control channel, such as the PUCCH or on a UL data channel, such as the PUSCH. The release may also be indicated by sending a final IUA-UL transmission with padding. The eNB 100 may interpret this IUA-UL transmission as indication of the release.

The indication of the release informs the cellular network about the release, which enables utilization of the released UL radio resources for other purposes, e.g., allocation to other UEs.

In some scenarios, the release does not need to be indicated, but may be detected by the eNB 100 on the basis of the release rule as applied by the UE 10. For example, similar to the UE 10, the eNB 100 could monitor a counter for the number of unused occasions for performing an IUA-UL transmission or could monitor a timer started when sending the IUA-UL grant.

In some scenarios, the release of the UL resources of the IUA-UL grant may be only temporary. In other words, the IUA operation of the UE 10 could be suspended or paused, to be resumed at a later point of time.

Resuming of the IUA operation may be triggered by explicit signaling or implicitly. For example, the resuming of the IUA operation may be triggered a configurable time period after the release, a configurable time period after the last IUA-UL transmission, or a configurable time period after when no more UL data was available for transmission.

Such time periods may also be defined in terms of the time intervals between occasions for IUA-UL transmissions, i.e., in terms of the IUA period. An example of a corresponding scenario is shown in FIG. 14.

Figure 14:
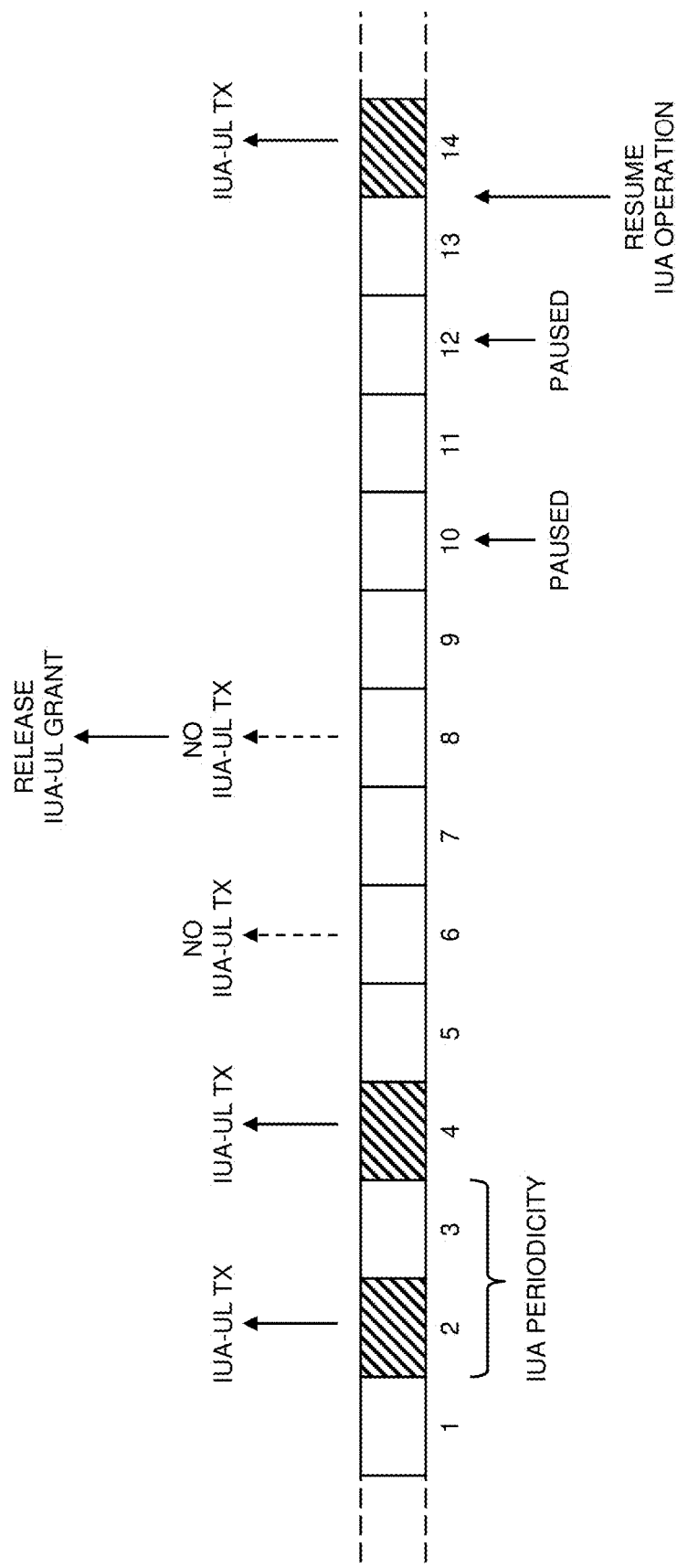
FIG. 14 illustrates a further exemplary scenario in which a temporary release of a UL grant is controlled according to an embodiment of the invention.

In the scenario of FIG. 14, it is assumed that the IUA-UL grant allocates UL radio resources in every second TTI (TTI 2, 4, 6, 8, . . . ). Further, utilization of a release rule is assumed, according to which the UL radio resources indicated by the IUA-UL grant are temporarily released after two unused occasions for performing a IUA-UL transmission. The TTIs which are utilized for sending a IUA-UL transmission are shown as shaded boxes. As can be seen, IUA-UL transmissions are performed in TTIs 2 and 4, while no IUA-UL transmissions are performed in TTIs 6 and 8. Accordingly, since the occasions for performing an IUA-UL transmissions in TTI 6 and 8 were left unused, in TTI 8 the UE 10 temporarily releases the UL radio resources indicated by the IUA-UL grant. In TTIs 10 and 12 the IUA operation is paused, and then resumed in TTI 14, in which an IUA-UL transmission is performed again.

Resuming the IUA operation may also optionally be indicated to the eNB 100, e.g., by sending an explicit indication or padding in the first IUA-UL transmission after resuming the IUA operation.

In some scenarios, resuming of the IUA operation may also be triggered after a configurable time period or a configurable number of IUA periods from the last performed IUA-UL transmission. In some scenarios, resuming of the IUA operation may also be triggered after a configurable time or number of IUA periods from transmission of the IUA-UL grant, irrespective of performed IUA-UL transmissions.

The implicit release of the UL radio resources indicated in the IUA-UL grant allows for performing the release an efficient manner, e.g., without requiring excessive signaling overhead. Further, the release provides a possibility to react to changing load or channel conditions for the UE 10, e.g., to optimize system capacity.

Figure 15:
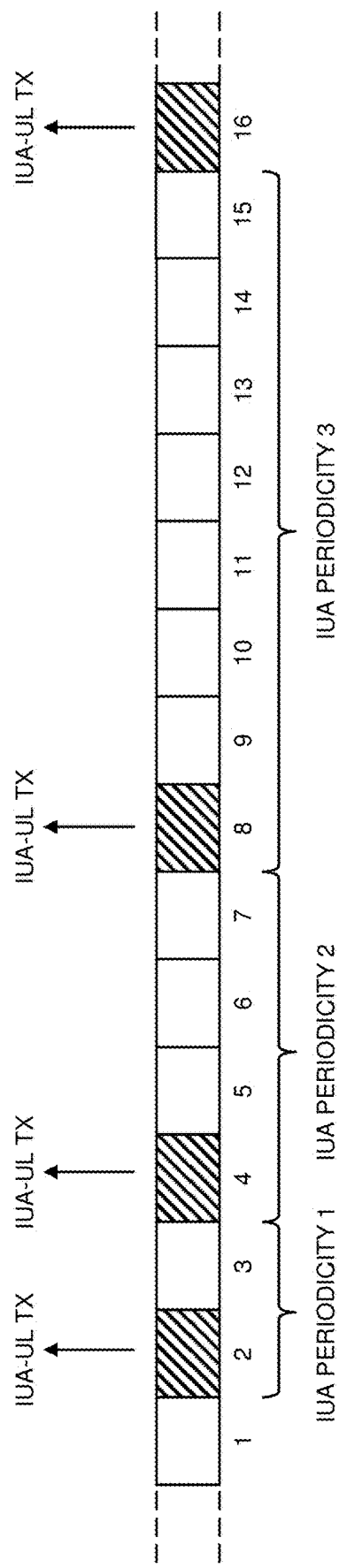
FIG. 15 illustrates a further exemplary scenario in which a UL grant is reconfigured according to an embodiment of the invention.

Instead of releasing the UL resources of the IUA-UL grant, it is also possible to reconfigure the periodicity of the IUA-UL grant. For example the IUA period may controlled to increase, such as according to an exponential function as illustrated in the example of FIG. 15 in which a first IUA periodicity is 2 TTIs, a second IUA periodicity is 4 ms, and a third IUA periodicity is 8 ms. Other functions or patterns defining the increase could be applied as well. In the example of FIG. 15, the increase of the IUA period is assumed to be triggered already at transmission of the IUA-UL grant. Alternatively, the increase could be triggered instead of the release in the above-mentioned release rules.

Figure 16:
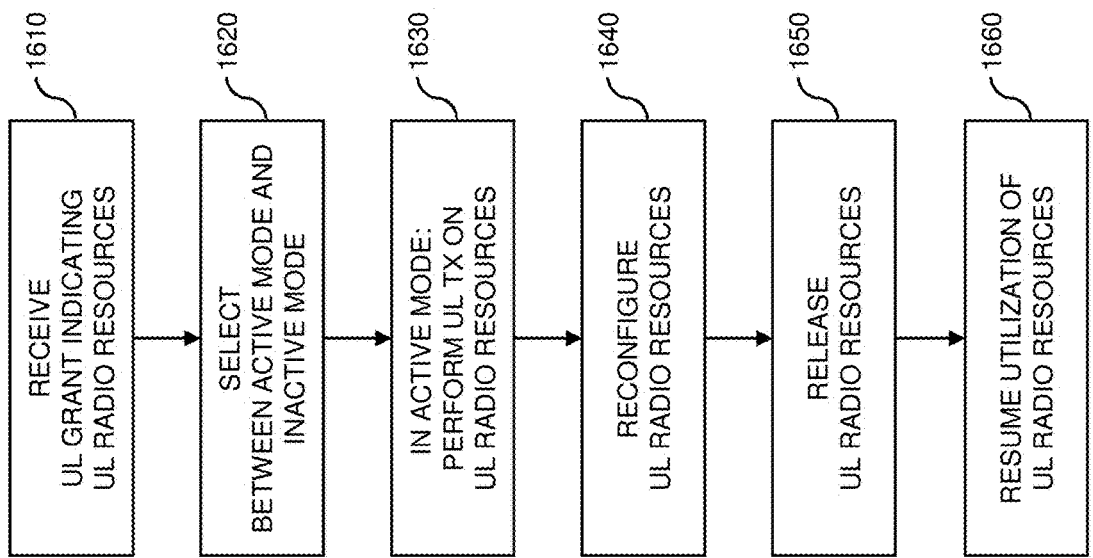
FIG. 16 shows a flowchart for illustrating a method according to an embodiment of the invention.

FIG. 16 shows a flowchart for illustrating a method of controlling radio transmission in a cellular network. The method may be used for implementing the above-described concepts in a communication device with connectivity to the cellular network, e.g., the UE 10. If a processor based implementation of the communication device is used, the steps of the method may be performed by one or more processors of the communication device. For this purpose, the processor(s) may execute correspondingly configured program code. Further, at least some of the corresponding functionalities may be hardwired in the processor(s).

At step 1610, the communication device receives a UL grant from the cellular network. The communication device may receive the UL grant on a DL control channel, e.g., a PDCCH of the LTE radio access technology. The UL grant indicates UL radio resources allocated to the communication device in reoccurring time intervals. Examples of such UL grant are the IUA-UL grants 203, 701, 801, and 903. The time intervals may reoccur periodically. However, other patterns of reoccurrence could be utilized as well. A periodicity in which the time intervals reoccur may be indicated in the UL grant or in separate control information transmitted to the communication device, such as in the configuration information 201 of FIG. 2 or in the configuration information 901 of FIG. 9. The time intervals may correspond to TTIs in which radio transmission in the cellular network is organized. For example, in the LTE radio technology the radio transmission may be organized in radio frames each subdivided into subframes, and the time intervals may correspond to subframes. The allocated UL radio resources may be radio resources of a UL data channel, such as a PUSCH of the LTE radio access technology.

At step 1620, the communication device selects between an active mode and an inactive mode. This selection is performed for each of the time intervals with allocated UL radio resources indicated at step 1610. In the active mode the communication device performs a UL transmission in the allocated UL radio resources. In the inactive mode the communication device performs no UL transmission in the allocated UL radio resources. Accordingly, the utilization of the UL radio resources allocated by the UL grant of step 1610 is conditional.

The selection of step 1620 may involve that the communication device checks whether UL data is available for transmission by the communication device. In response to UL data being available for transmission, the communication device may select the active mode to perform a UL transmission which includes at least a part of the UL data.

In response to UL data being available for transmission, the communication device may also send a scheduling request to the cellular network, thereby requesting allocation of further UL radio resources to the communication device. An example of such scheduling request is the scheduling request 303.

Further, the selection of step 1620 may involve that the communication device checks whether one or more conditions for sending a BSR, indicating an amount of UL data available for transmission by the communication device, are met. In response to one or more of such conditions being met, the communication device may selecting the active mode to send a UL transmission including the BSR.

If the active mode was selected at step 1620, the communication device performs a UL transmission at step 1630. The UL transmission may include the UL data and/or the BSR as mentioned in connection with step 1620. Examples of such UL transmissions are the IUA-UL transmissions 211, 302, 402, 410, 704, 705, 803, 804, and 805. If the inactive mode was selected at step 1620, the communication device performs no UL transmission on the allocated UL radio resources indicated at step 1610.

In some scenarios, in response to receiving the UL grant at step 1610, the communication device may also send a message for acknowledging receipt of the UL grant to the cellular network. For this purpose, the communication device may select the active mode in a first one of the time intervals to send a UL transmission including the message for acknowledging receipt of the UL grant. Examples of such UL transmissions are the IUA-UL transmissions 205, 702, 906, and 911.

In some scenarios, receipt of the UL grant at step 1610 may cause the communication device to send one or more reference signals to the cellular network. An example of such reference signals are the aperiodic SRS as explained in connection with FIG. 9.

In some scenarios the UL transmission sent at step 1630 may include an indication of a channel quality experienced by the communication device, e.g., a CSI report as explained in connection with FIG. 10.

In some scenarios, the communication device may also receive a further UL grant which indicates further UL radio resources allocated to the communication device in one of the time intervals. Examples of such further UL grant are the D-UL grants 305, 404, 408; 706, 707, and 802. The communication device may then perform a UL transmission in a combination of the further UL radio resources allocated by this further UL grant and at least a part of the UL radio resources allocated by the UL grant of step 1610. An example of such combined utilization of the UL radio resources allocated by different UL grants is explained in connection with FIG. 8.

At step 1640, the communication device may reconfigure the UL radio resources allocated by the UL grant of step 1610. This may for example involve changing a periodicity of the time intervals with the allocated UL radio resources, e.g., as explained in connection with the scenario of FIG. 15. The reconfiguration of step 1610 may be triggered according to a rule configured in the communication device, similar to the release rules explained in connection with FIGS. 11, 12, 13, and 14. Further, the reconfiguration could be triggered by receipt of the UL grant at step 1610 or by control information from the cellular network.

At step 1650, the communication device may release the UL radio resources allocated by the UL grant of step 1610. The communication device may release the allocated UL radio resources in response to receiving control information from the cellular network. Further, the communication device may release the allocated UL radio resources in response to expiry of a configured time period. Such time period may also be defined in terms of periods in which the allocated UL radio resources reoccur. Further, the communication device may release the allocated UL radio resources in response to a number of the time intervals, in which the communication device performed no transmission on the allocated UL resources, reaching a threshold. Examples of corresponding release rules for implicitly controlling release of the UL radio resources are explained in connection with FIGS. 11 to 13. The communication device may also indicate the release of the allocated UL radio resources to the cellular network, e.g., by sending corresponding control information or by performing a UL transmission with padding on the UL radio resources.

In some scenarios, the release of the UL radio resources may be temporary, i.e., utilization of the UL radio resources by the communication device may be paused or suspended. Accordingly, after temporarily releasing the UL radio resources at step 1650, the communication device may resume utilization of the allocated UL radio resources at step 1660. This resumption may be in response to receiving control information from the cellular network. Further, the resumption of utilization of the allocated UL radio resources may also be in response to expiry of a configured time period. Such time period may also be defined in terms of periods in which the allocated UL radio resources reoccur. The time period may start at a certain event, e.g., receipt of the UL grant at step 1610, temporary release of the allocated UL radio resources at step 1650, or last utilization of the allocated UL radio resources by the communication device. The communication device may also indicate the resumption of utilization of the allocated UL radio resources to the cellular network, e.g., by sending corresponding control information or by performing a UL transmission with padding on the UL radio resources.

Figure 17:
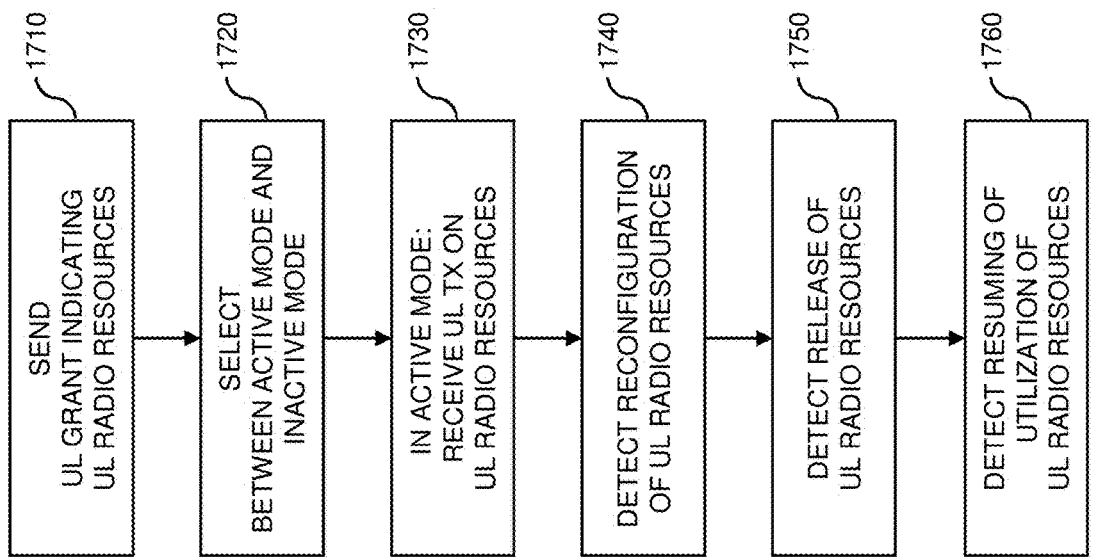
FIG. 17 shows a flowchart for illustrating a further method according to an embodiment of the invention.

FIG. 17 shows a flowchart for illustrating a method of controlling radio transmission in a cellular network. The method may be used for implementing the above-described concepts in a node of the cellular network, e.g., in a node which is responsible for scheduling transmissions, such as the eNB 100 or an RNC when using the UMTS radio access technology. If a processor based implementation of the node is used, the steps of the method may be performed by one or more processors of the node. For this purpose, the processor (s) may execute correspondingly configured program code. Further, at least some of the corresponding functionalities may be hardwired in the processor(s).

At step 1710, the node sends a UL grant to a communication device. The node may send the UL grant on a DL control channel, e.g., a PDCCH of the LTE radio access technology. The UL grant indicates UL radio resources allocated to the communication device in reoccurring time intervals. Examples of such UL grant are the IUA-UL grants 203, 701, 801, and 903. The time intervals may reoccur periodically. However, other patterns of reoccurrence could be utilized as well. A periodicity in which the time intervals reoccur may be indicated in the UL grant or in separate control information transmitted to the communication device, such as in the configuration information 201 of FIG. 2 or in the configuration information 901 of FIG. 9. The time intervals may correspond to TTIs in which radio transmission in the cellular network is organized. For example, in the LTE radio technology the radio transmission may be organized in radio frames each subdivided into subframes, and the time intervals may correspond to subframes. The allocated UL radio resources may be radio resources of a UL data channel, such as a PUSCH of the LTE radio access technology.

The node may send the UL grant in response to detecting a change of a connection status of the communication device, e.g., when the communication device enters the cellular network and connects thereto, when the communication device enters a different cell or area of the cellular network, or the like. Further, the node may send the UL grant according to a periodic schedule, e.g., every minute or hour. In each case, no request for the UL grant by the communication device is required.

At step 1720, the node device selects between an active mode and an inactive mode. This selection is performed for each of the time intervals with allocated UL radio resources indicated at step 1710. In the active mode the communication device performed a UL transmission in the allocated UL radio resources. In the inactive mode the communication device performed no UL transmission in the allocated UL radio resources. Accordingly, the node decides for each of the time intervals whether the communication device performed a transmission on the allocated UL radio resources. This may for example be accomplished by detecting signals from the communication device in the allocated UL radio resources. In response to detecting no signals from the communication device in the allocated UL radio resources, the node may select the inactive mode. In response to detecting signals from the communication device in the allocated UL radio resources, the node may select the active mode.

If the active mode was selected at step 1720, the node may receive a UL transmission from the communication device at step 1730. The UL transmission may include UL data and/or a BSR indicating an amount of UL data available for transmission by the communication device. Examples of such UL transmissions are the IUA-UL transmissions 211, 302, 402, 410, 704, 705, 803, 804, and 805. If the inactive mode was selected at step 1720, the node does not attempt receiving a UL transmission on the allocated UL radio resources indicated at step 1710 and also refrains from performing any further action associated with such possible UL transmission, e.g., sending feedback for notifying the communication device of a missing UL transmission.

In some scenarios, the node may use the BSR in the UL transmission as a basis for sending a further UL grant to the communication device. The further UL grant indicates further UL radio resources allocated to the communication device in one of the time intervals. Examples of such further UL grant are the D-UL grants 305, 404, 408; 706, 707, and 802. An example of a process for controlling the provision of the further UL grant is explained in connection with FIG. 6. The node may then receive a UL transmission in a combination of the further UL radio resources allocated by this further UL grant and at least a part of the UL radio resources allocated by the UL grant of step 1710. An example of such combined utilization of the UL radio resources allocated by different UL grants is explained in connection with FIG. 8.

In some scenarios, the node may also expect a message for acknowledging receipt of the UL grant sent at step 1710. In response to not receiving such message, the node may resend the UL grant. In some scenarios, the node may select the active mode in a first one of the time intervals to receive a UL transmission including the message for acknowledging receipt of the UL grant. Examples of such UL transmissions are the IUA-UL transmissions 205, 702, 906, and 911.

In some scenarios, receipt of the UL grant sent at step 1710 may cause the communication device to send one or more reference signals to the cellular network. An example of such reference signals are the aperiodic SRS as explained in connection with FIG. 9. The node may then adapt a radio link to the communication device on the basis of the reference signals or modify the UL grant, e.g., as explained in connection with FIG. 9.

In some scenarios the UL transmission received at step 1730 may include an indication of a channel quality experienced by the communication device, e.g., a CSI report as explained in connection with FIG. 10. The node may then adapt a radio link to the communication device on the basis of the indicated channel quality, e.g., as explained in connection with FIG. 10.

At step 1740, the node may detect that the communication device performed a reconfiguration of the UL radio resources allocated by the UL grant of step 1710. This reconfiguration may for example involve changing a periodicity of the time intervals with the allocated UL radio resources, e.g., as explained in connection with the scenario of FIG. 15. The reconfiguration of step 1710 may be triggered according to a rule configured in the communication device, similar to the release rules explained in connection with FIGS. 11, 12, 13, and 14, and the node may apply a corresponding rule for detecting the reconfiguration. The reconfiguration may also be detected on the basis of an indication from the communication device.

At step 1750, the node may detect that the communication device performed a release of the UL radio resources allocated by the UL grant of step 1710. The communication device may have released the allocated UL radio resources in response to expiry of a configured time period. Such time period may also be defined in terms of periods in which the allocated UL radio resources reoccur. Further, the communication device may have released the allocated UL radio resources in response to a number of the time intervals, in which the communication device performed no transmission on the allocated UL resources, reaching a threshold. Examples of corresponding release rules for implicitly controlling release of the UL radio resources are explained in connection with FIGS. 11 to 13. The node may apply corresponding rules for detecting the release, e.g., detect the release on the basis of expiry of a configured time period or on the basis of a number of said time intervals, in which the communication device performed no transmission on the allocated UL resources, reaching a threshold.

In some scenarios, the communication device may also indicate the release of the allocated UL radio resources to the node, e.g., by sending corresponding control information or by performing a UL transmission with padding on the UL radio resources. The node may then detect the release on the basis of the indication from the communication device.

In some scenarios, the release of the UL radio resources may be temporary, i.e., utilization of the UL radio resources by the communication device may be paused or suspended. Accordingly, after the temporary release of the UL radio resources of step 1750, the communication device may resume utilization of the allocated UL radio resources. The node may detect this resumption at step 1760. The resumption of utilization of the allocated UL radio resources may be in response to expiry of a configured time period. Such time period may also be defined in terms of periods in which the allocated UL radio resources reoccur. The time period may start at a certain event, e.g., receipt of the UL grant at step 1710, temporary release of the allocated UL radio resources, or last utilization of the allocated UL radio resources by the communication device. The node may apply corresponding rules for detecting the resumption at step 1760, e.g., detect the resumption on the basis on the basis of expiry of a configured time period.

The communication device may also indicate the resumption of utilization of the allocated UL radio resources to the cellular network, e.g., by sending corresponding control information or by performing a UL transmission with padding on the UL radio resources. The node may then detect the resumption on the basis of the indication from the communication device.

It is to be understood that the methods of FIGS. 16 and 17 may be combined, e.g., in a system including a communication device operating according to the method of FIG. 16 and a node operating according to the method of FIG. 17.

Figure 18:
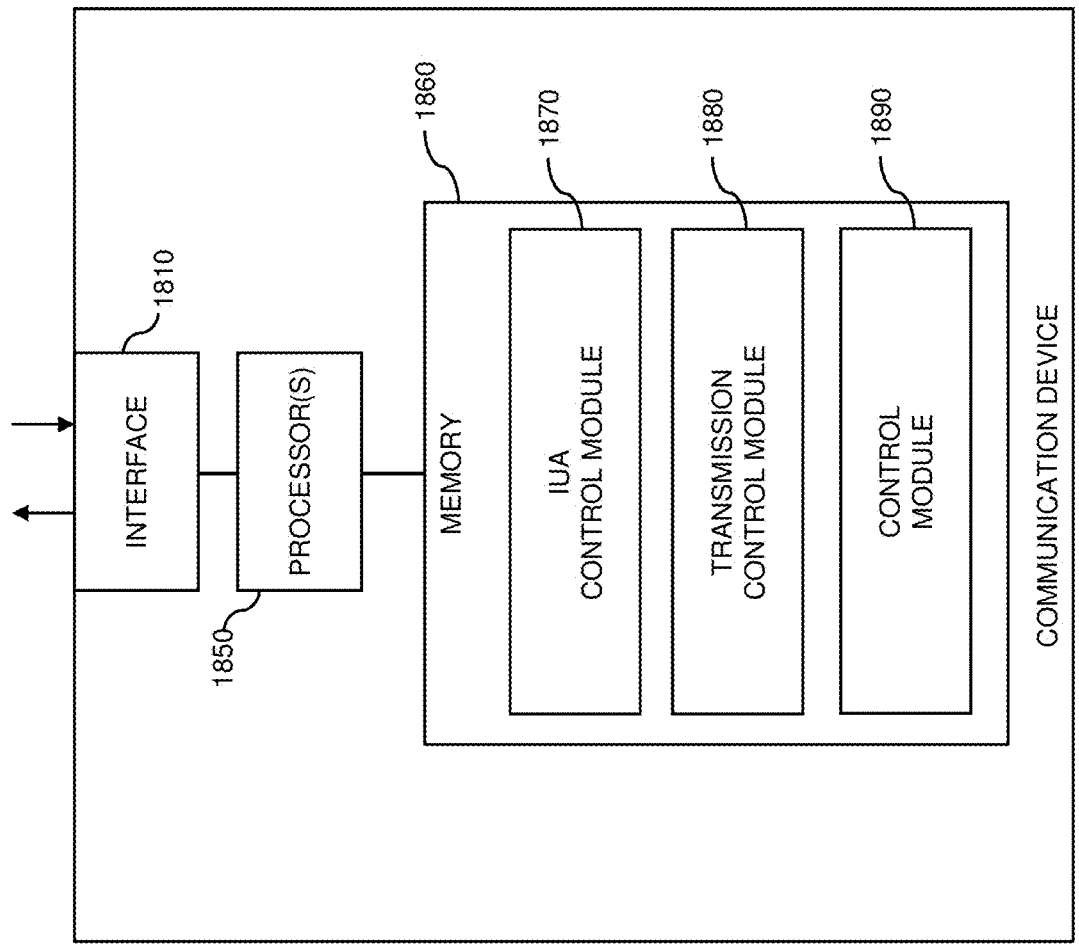
FIG. 18 schematically illustrates structures of a communication device according to an embodiment of the invention.

FIG. 18 illustrates exemplary structures which may be used for implementing the above concepts in a communication device, e.g., the UE 10.

As illustrated, the communication device may include an interface 1810 for connecting to a cellular network. For example, the interface may correspond to a radio interface as specified for the LTE radio access technology or based on another radio access technology, such as the UMTS radio access technology. The interface 1810 may be utilized for receiving the above-mentioned UL grants or for sending UL transmissions. Further, the interface 1810 may be utilized for receiving control information from the cellular network or sending control information to the cellular network.

Further, the communication device includes one or more processors 1850 coupled to the interface 1810, and a memory 1860 coupled to the processor(s) 1850. The memory 1860 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 1860 includes suitably configured program code to be executed by the processor(s) 1850 so as to implement the above-described functionalities of the communication device. In particular, the memory 1860 may include various program code modules for causing the communication device to perform processes as described above, e.g., corresponding to the method steps of FIG. 16. As illustrated, the memory 1860 may include a IUA control module 1870 for implementing the above-described functionalities of conditionally utilizing the UL radio resources allocated in reoccurring time intervals. Further, the memory 1860 may include a transmission control module 1880 for implementing the above-described functionalities of controlling the sending of UL transmissions from the communication device, e.g., on the UL radio resources in the reoccurring time intervals. Further, the memory 1860 may include a control module 1890 for implementing generic control functionalities, e.g., controlling reporting or other signaling.

It is to be understood that the structures as illustrated in FIG. 18 are merely schematic and that the communication device may actually include further components which, for the sake of clarity, have not been illustrated, e.g., further interfaces or processors. Also, it is to be understood that the memory 1860 may include further types of program code modules, which have not been illustrated, e.g., program code modules for implementing known functionalities of a UE. According to some embodiments, also a computer program may be provided for implementing functionalities of the communication device, e.g., in the form of a physical medium storing the program code and/or other data to be stored in the memory 1860 or by making the program code available for download or by streaming.

Figure 19:
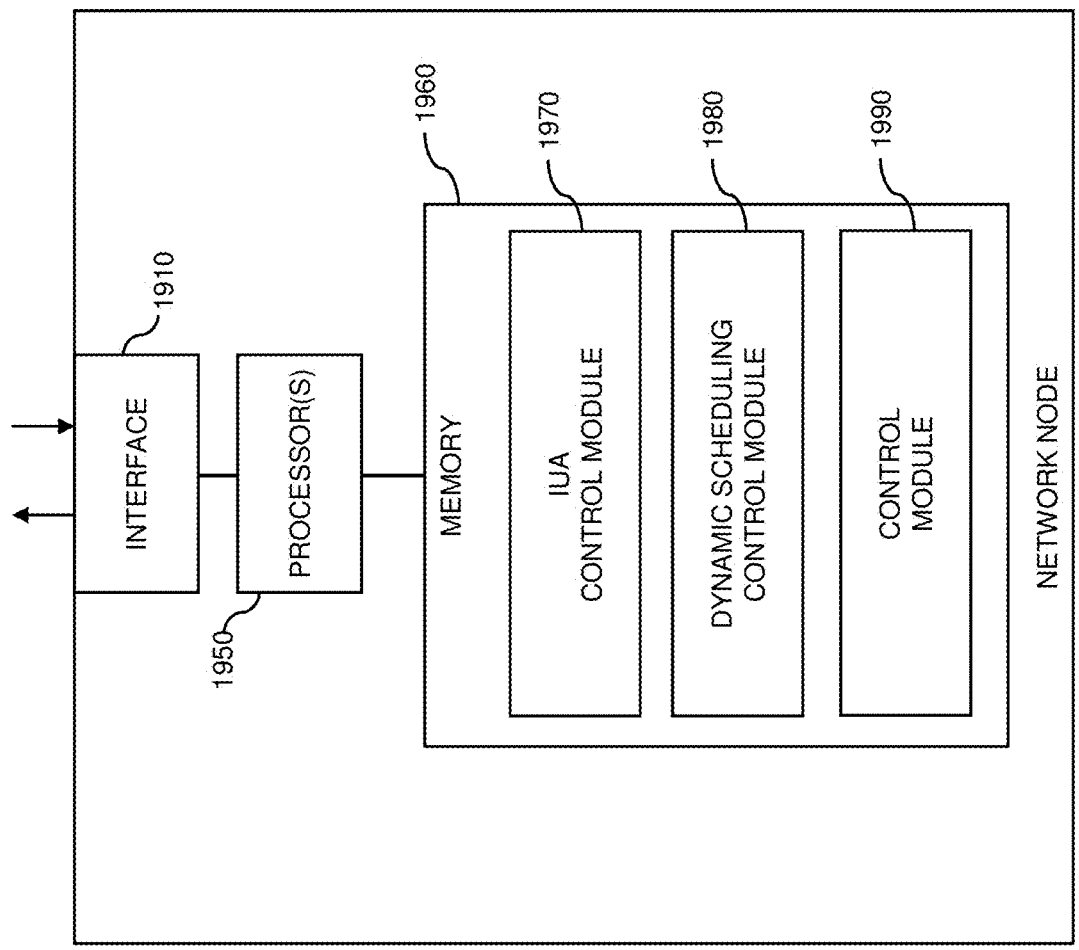
FIG. 19 schematically illustrates structures of a network node according to an embodiment of the invention.

FIG. 19 illustrates exemplary structures which may be used for implementing the above concepts in a node of a cellular network, e.g., the eNB 100.

As illustrated, the node may include an interface 1910 for connecting to a communication device. The interface 1910 may be utilized for sending the above-mentioned UL grants or for receiving UL transmissions. Further, the interface 1910 may be utilized for sending control information to the communication device or receiving control information from the communication device. If the node is implemented as a base station, such as the eNB 100, the interface 1910 may be a radio interface for establishing a radio link to a communication device. If the node is implemented as a control node of a base station, such as an RNC of the UMTS radio access technology, the interface 1910 may be used for controlling the base station and for sending or receiving transmissions by the communication devices via the base station.

Further, the node includes one or more processors 1950 coupled to the interface 1910, and a memory 1960 coupled to the processor(s) 1950. The memory 1960 may include a ROM, e.g., a flash ROM, a RAM, e.g., a DRAM or SRAM, a mass storage, e.g., a hard disk or solid state disk, or the like. The memory 1960 includes suitably configured program code to be executed by the processor(s) 1950 so as to implement the above-described functionalities of the communication device. In particular, the memory 1960 may include various program code modules for causing the node to perform processes as described above, e.g., corresponding to the method steps of FIG. 17. As illustrated, the memory 1960 may include a IUA control module 1970 for implementing the above-described functionalities of determining a UL grant allocating UL resources in reoccurring time intervals and controlling the utilization of such UL grant. Further, the memory 1960 may include a dynamic scheduling module 1980 for implementing the above-described functionalities of dynamically sending UL grants with respect to a certain time interval. Further, the memory 1960 may include a control module 1990 for implementing generic control functionalities, e.g., controlling reporting or other signaling.

It is to be understood that the structures as illustrated in FIG. 19 are merely schematic and that the node may actually include further components which, for the sake of clarity, have not been illustrated, e.g., further interfaces or processors. Also, it is to be understood that the memory 1960 may include further types of program code modules, which have not been illustrated, e.g., program code modules for implementing known functionalities of an eNB or RNC. According to some embodiments, also a computer program may be provided for implementing functionalities of the node, e.g., in the form of a physical medium storing the program code and/or other data to be stored in the memory 1960 or by making the program code available for download or by streaming.

As can be seen, the concepts as described above may be used for achieving a low latency for UL transmissions by a communication device. Specifically, by allowing conditional utilization of the UL radio resources allocated in reoccurring time intervals, an energy efficient operation of the communication device and low interference level may be achieved.

It is to be understood that the examples and embodiments as explained above are merely illustrative and susceptible to various modifications. For example, the illustrated nodes may be implemented by a single device or by a system of multiple devices. Moreover, it is to be understood that the above concepts may be implemented by using correspondingly designed software to be executed by one or more processors of an existing device, or by using dedicated device hardware.

What is claimed is:

1. A method performed by a communication device, the method comprising:
   receiving an uplink grant from a cellular network, the uplink grant indicating uplink radio resources allocated to the communication device in reoccurring time intervals;
   responding to the uplink grant by transmitting an acknowledgment of receipt of the uplink grant on the allocated uplink radio resources in a first one of the reoccurring time intervals; and
   with respect to each subsequent one of the reoccurring time intervals, selecting between an active mode in which the communication device performs an uplink transmission on the allocated uplink radio resources for transmission of data or control information, and an inactive mode in which the communication device performs no uplink transmission on the allocated uplink radio resources.

2. The method of claim 1, wherein selecting between the active mode and the inactive mode comprises selecting the active mode in response to uplink data being available for transmission.

3. The method of claim 1, wherein selecting between the active mode and the inactive mode comprises selecting the inactive mode in response to no uplink data being available for transmission.

4. The method of claim 1, wherein selecting between the active mode and the inactive mode comprises selecting the active mode in response to either uplink data being available for transmission or a condition for sending a buffer status report being met, and, otherwise, selecting the inactive mode.

5. The method of claim 1, wherein transmitting the acknowledgment receipt comprises performing an uplink transmission with padding on unused ones among the allocated uplink radio resources.

6. The method of claim 1, further comprising selecting the active mode in one of the reoccurring time intervals for sending a buffer status report (BSR) and receiving a dynamic uplink grant in response, the dynamic uplink grant indicating further allocated uplink radio resources granted to the communication device in a subsequent one of the reoccurring time intervals, and, in the subsequent reoccurring time interval, transmitting uplink data on the allocated uplink radio resources and the further allocated uplink radio resources.

7. The method of claim 1, further comprising subsequently releasing the allocated uplink radio resources responsive to expiry of a period or upon reaching a number of successive selections of the inactive mode.

8. The method of claim 7, further comprising the communication device indicating the release to the cellular network by sending an indication of the release to the cellular network using the allocated uplink radio resources in one of the reoccurring time intervals.

9. The method of claim 1, further comprising subsequently releasing the allocated uplink radio resources in response to receiving control information from the cellular network.

10. The method of claim 1, wherein receiving the uplink grant comprises receiving a Semi-Persistent Scheduling (SPS) grant from the cellular network.

11. A communication device comprising:
a wireless interface; and
a processor configured to:
receive an uplink grant from a cellular network via the wireless interface, the uplink grant indicating uplink radio resources allocated to the communication device in reoccurring time intervals;
respond to the uplink grant by transmitting an acknowledgment of receipt of the uplink grant on the allocated uplink radio resources in a first one of the reoccurring time intervals; and
with respect to each subsequent one of the reoccurring time intervals, select between an active mode in which the communication device performs an uplink transmission on the allocated uplink radio resources for transmission of data or control information, and an inactive mode in which the communication device performs no uplink transmission on the allocated uplink radio resources.

12. The communication device of claim 11, wherein the processor is configured to select the active mode in response to uplink data being available for transmission.

13. The communication device of claim 11, wherein the processor is configured to select the inactive mode in response to no uplink data being available for transmission.

14. The communication device of claim 11, wherein the processor is configured to select the active mode either in response to uplink data being available for transmission or a condition for sending a buffer status report being met, and, otherwise, select the inactive mode.

15. The communication device of claim 11, wherein, for transmitting the acknowledgment receipt, the processor is configured to perform an uplink transmission with padding on unused ones among the allocated uplink radio resources.

16. The communication device of claim 11, wherein the processor is configured to select the active mode in one of the reoccurring time intervals for sending a buffer status report (BSR) and receive a dynamic uplink grant in response, the dynamic uplink grant indicating further allocated uplink radio resources granted to the communication device in a subsequent one of the reoccurring time intervals, and, in the subsequent reoccurring time interval, transmit uplink data on the allocated uplink radio resources and the further allocated uplink radio resources.

17. The communication device of claim 11, wherein the processor is configured to release the allocated uplink radio resources in response to expiry of a period or reaching a number of successive selections of the inactive mode.

18. The communication device of claim 17, wherein the processor is configured to indicate the release to the cellular network by sending an indication of the release to the cellular network using the allocated uplink radio resources in one of the reoccurring time intervals.

19. The communication device of claim 11, wherein the processor is configured to release the allocated uplink radio resources responsive to receiving control information from the cellular network.

20. The communication device of claim 11, wherein the uplink grant comprises a Semi-Persistent Scheduling (SPS) grant from the cellular network.

* * * * *